US010180597B2

(12) United States Patent
Murata et al.

(10) Patent No.: US 10,180,597 B2
(45) Date of Patent: *Jan. 15, 2019

(54) LIQUID CRYSTAL DISPLAY DEVICE, POLARIZING PLATE, AND POLARIZER PROTECTION FILM

(75) Inventors: Kouichi Murata, Tsuruga (JP); Mitsuharu Nakatani, Otsu (JP); Yasushi Sasaki, Tokyo (JP)

(73) Assignee: TOYOBO CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/118,169

(22) PCT Filed: May 16, 2012

(86) PCT No.: PCT/JP2012/062477
§ 371 (c)(1),
(2), (4) Date: Nov. 15, 2013

(87) PCT Pub. No.: WO2012/157663
PCT Pub. Date: Nov. 22, 2012

(65) Prior Publication Data
US 2014/0098325 A1 Apr. 10, 2014

(30) Foreign Application Priority Data

May 18, 2011 (JP) ................. 2011-111441

(51) Int. Cl.
G02F 1/13363 (2006.01)
G02F 1/1335 (2006.01)
G02B 5/30 (2006.01)
G02B 1/111 (2015.01)
G02B 1/11 (2015.01)

(52) U.S. Cl.
CPC .......... *G02F 1/133611* (2013.01); *G02B 1/11* (2013.01); *G02B 1/111* (2013.01); *G02B 5/3083* (2013.01); *G02F 1/133528* (2013.01); *G02F 2201/50* (2013.01); *G02F 2202/40* (2013.01); *Y10T 428/105* (2015.01); *Y10T 428/1041* (2015.01)

(58) Field of Classification Search
CPC ............. G02F 1/13363; G02F 2202/40; G02F 1/133528; G02F 2201/50; G02F 1/133611; G02B 5/3083; G02B 5/3033; G02B 1/111; Y10T 428/1041
USPC .................................................. 349/117, 181
See application file for complete search history.

(56) References Cited

U.S. PATENT DOCUMENTS

| 4,072,779 A * | 2/1978 | Knox ................ B32B 17/10009 264/290.2 |
| 4,586,790 A | 5/1986 | Umeda et al. |
| 4,592,623 A * | 6/1986 | Yamamoto .......... G02B 5/3033 349/122 |
| 4,799,772 A | 1/1989 | Utsumi |
| 5,145,746 A | 9/1992 | Tomoyuki |
| 5,231,145 A | 7/1993 | Brueckmann et al. |
| 5,677,024 A | 10/1997 | Abe et al. |
| 5,757,447 A | 5/1998 | Kobayashi et al. |
| 5,998,925 A * | 12/1999 | Shimizu et al. .............. 313/503 |
| 6,025,433 A | 2/2000 | Shibatoh et al. |
| 6,055,096 A | 4/2000 | Michihata et al. |
| 6,069,440 A | 5/2000 | Shimizu et al. |
| 6,104,484 A | 8/2000 | Nagata et al. |
| 6,280,890 B1 | 8/2001 | Sawamura et al. |
| 6,521,700 B1 | 2/2003 | Dworak et al. |
| 6,608,332 B2 | 8/2003 | Shimizu et al. |
| 6,614,179 B1 | 9/2003 | Shimizu et al. |
| 6,839,171 B2 | 1/2005 | Mizutani et al. |
| 7,026,756 B2 | 4/2006 | Shimizu et al. |
| 7,071,616 B2 | 7/2006 | Shimizu et al. |
| 7,126,274 B2 | 10/2006 | Shimizu et al. |
| 7,128,952 B2 | 10/2006 | Murakami et al. |
| 7,215,074 B2 | 5/2007 | Shimizu et al. |
| 7,329,988 B2 | 2/2008 | Shimizu et al. |
| 7,362,048 B2 | 4/2008 | Shimizu et al. |
| 7,531,960 B2 | 5/2009 | Shimizu et al. |
| 7,569,269 B2 | 8/2009 | Takada et al. |
| 7,633,583 B2 | 12/2009 | Wang et al. |
| 7,682,848 B2 | 3/2010 | Shimizu et al. |
| 7,781,068 B2 | 8/2010 | Nakamura et al. |
| 7,855,092 B2 | 12/2010 | Shimizu et al. |
| 7,887,718 B2 | 2/2011 | Nagatomi et al. |
| 7,901,959 B2 | 3/2011 | Shimizu et al. |
| 7,911,553 B2 | 3/2011 | Tanaka |
| 7,915,631 B2 | 3/2011 | Shimizu et al. |
| 7,943,941 B2 | 5/2011 | Shimizu et al. |
| 7,968,019 B2 | 6/2011 | Murakami |
| 7,968,866 B2 | 6/2011 | Shimizu et al. |
| 7,969,090 B2 | 6/2011 | Shimizu et al. |
| 8,139,042 B2 | 3/2012 | Iijima |
| 8,148,177 B2 | 4/2012 | Shimizu et al. |
| 8,274,631 B2 | 9/2012 | Wang et al. |
| 8,687,152 B2 | 4/2014 | Izaki et al. |
| 8,760,601 B2 | 6/2014 | Izaki et al. |

(Continued)

FOREIGN PATENT DOCUMENTS

| CN | 1320219 A | 10/2001 |
| CN | 1331272 A | 1/2002 |

(Continued)

OTHER PUBLICATIONS

Japanese Patent Office, International Search Report in International Patent Application No. PCT/JP2014/062286 (dated Jul. 22, 2014).

(Continued)

*Primary Examiner* — Jia Pan
(74) *Attorney, Agent, or Firm* — Leydig, Voit & Mayer, Ltd.

(57) ABSTRACT

The invention provides a liquid crystal display device, as well as a polarizer and a protective film suitable for the liquid crystal display device. The liquid crystal display device comprises a backlight light source, two polarizers, and a liquid crystal cell disposed between the two polarizers; the backlight light source being a white light-emitting diode light source; each of the two polarizers comprising a polarizing film and protective films laminated on both sides of the polarizing film; at least one of the protective films being a polyester film having an adhesion-facilitating layer; the polyester film having a retardation of 3,000 to 30,000 nm; and the adhesion-facilitating layer comprising a polyester resin (A) and a polyvinyl alcohol resin (B).

23 Claims, No Drawings

(56) References Cited

U.S. PATENT DOCUMENTS

| | | |
|---|---|---|
| 2001/0001207 A1 | 5/2001 | Shimizu et al. |
| 2002/0061394 A1 | 5/2002 | Fujita |
| 2002/0061959 A1* | 5/2002 | Kajimaru ............... C08J 3/03 524/601 |
| 2003/0156235 A1 | 8/2003 | Kuzuhara et al. |
| 2004/0000868 A1 | 1/2004 | Shimizu et al. |
| 2004/0004437 A1 | 1/2004 | Shimizu et al. |
| 2004/0090180 A1 | 5/2004 | Shimizu et al. |
| 2004/0109302 A1 | 6/2004 | Yoneda et al. |
| 2004/0137265 A1 | 7/2004 | Shimada et al. |
| 2004/0222435 A1 | 11/2004 | Shimizu et al. |
| 2004/0265539 A1 | 12/2004 | Hashimoto et al. |
| 2005/0030456 A1 | 2/2005 | Murakami et al. |
| 2005/0100723 A1 | 5/2005 | Tanaka et al. |
| 2005/0106334 A1 | 5/2005 | Kubo et al. |
| 2005/0134774 A1 | 6/2005 | Coates et al. |
| 2005/0168816 A1 | 8/2005 | Fukaishi et al. |
| 2005/0247223 A1* | 11/2005 | Sampei ............... B41C 1/1025 101/460 |
| 2005/0275779 A1 | 12/2005 | Nanno |
| 2005/0280357 A1 | 12/2005 | Shimizu et al. |
| 2006/0039070 A1 | 2/2006 | Sugimura et al. |
| 2006/0066946 A1 | 3/2006 | Liu et al. |
| 2006/0216437 A1 | 9/2006 | Murakami |
| 2006/0227439 A1 | 10/2006 | Taki et al. |
| 2006/0275559 A1 | 12/2006 | Ishibashi et al. |
| 2007/0008451 A1 | 1/2007 | Tanaka |
| 2007/0009676 A1 | 1/2007 | Tamagawa et al. |
| 2007/0046864 A1 | 3/2007 | Maruyama et al. |
| 2007/0046865 A1 | 3/2007 | Umeda et al. |
| 2007/0048460 A1 | 3/2007 | Ikeda |
| 2007/0054066 A1 | 3/2007 | Usukura et al. |
| 2007/0114914 A1 | 5/2007 | Shimizu et al. |
| 2007/0159060 A1 | 7/2007 | Shimizu et al. |
| 2007/0178297 A1 | 8/2007 | Takada et al. |
| 2007/0202272 A1 | 8/2007 | Yamamoto et al. |
| 2007/0224415 A1 | 9/2007 | Satake et al. |
| 2007/0238049 A1* | 10/2007 | Ezure ............... B41C 1/1016 430/270.1 |
| 2007/0242199 A1 | 10/2007 | Harada |
| 2007/0264447 A1* | 11/2007 | Oya ............... B32B 7/02 428/1.31 |
| 2007/0285776 A1 | 12/2007 | Nakamura et al. |
| 2008/0023132 A1 | 1/2008 | Sano et al. |
| 2008/0049324 A1 | 2/2008 | Murakami et al. |
| 2008/0050583 A1* | 2/2008 | Kubo ............... C08L 67/02 428/339 |
| 2008/0131704 A1 | 6/2008 | Mizuno et al. |
| 2008/0138527 A1* | 6/2008 | Okuma ............... C09D 161/28 427/385.5 |
| 2008/0138918 A1 | 6/2008 | Shimizu et al. |
| 2008/0218666 A1 | 9/2008 | Toyooka |
| 2008/0233312 A1* | 9/2008 | Nakamura et al. ......... 428/1.31 |
| 2008/0266500 A1 | 10/2008 | Nimura |
| 2008/0303995 A1 | 12/2008 | Shimodaira et al. |
| 2009/0027599 A1 | 1/2009 | Ohgaru et al. |
| 2009/0059134 A1 | 3/2009 | Ishikawa et al. |
| 2009/0104413 A1 | 4/2009 | Ahn et al. |
| 2009/0139564 A1 | 6/2009 | Miyaji et al. |
| 2009/0153965 A1 | 6/2009 | Ito et al. |
| 2009/0244474 A1 | 10/2009 | Fuchida et al. |
| 2009/0251643 A1 | 10/2009 | Yamada et al. |
| 2009/0280310 A1 | 11/2009 | Nitta et al. |
| 2009/0303481 A1 | 12/2009 | Nakai |
| 2009/0315014 A1 | 12/2009 | Shimizu et al. |
| 2009/0315015 A1 | 12/2009 | Shimizu et al. |
| 2009/0316068 A1 | 12/2009 | Shimizu et al. |
| 2010/0001258 A1 | 1/2010 | Shimizu et al. |
| 2010/0006819 A1 | 1/2010 | Shimizu et al. |
| 2010/0019224 A1 | 1/2010 | Shimizu et al. |
| 2010/0019270 A1 | 1/2010 | Shimizu et al. |
| 2010/0053511 A1 | 3/2010 | Ohmuro et al. |
| 2010/0073313 A1 | 3/2010 | Iijima |
| 2010/0098939 A1* | 4/2010 | Tada ............... B05D 5/068 428/336 |
| 2010/0117516 A1 | 5/2010 | Shimizu et al. |
| 2010/0177397 A1* | 7/2010 | Kamiyama ............... G02B 5/02 359/609 |
| 2010/0220266 A1* | 9/2010 | Kashima ............... G02B 1/105 349/96 |
| 2010/0233389 A1 | 9/2010 | Suzuki et al. |
| 2010/0264841 A1 | 10/2010 | Shimizu et al. |
| 2010/0264842 A1 | 10/2010 | Shimizu et al. |
| 2010/0296027 A1 | 11/2010 | Matsuhira et al. |
| 2011/0019275 A1 | 1/2011 | Suzuki |
| 2011/0053299 A1 | 3/2011 | Shimieu et al. |
| 2011/0062864 A1 | 3/2011 | Shimizu et al. |
| 2011/0085106 A1 | 4/2011 | Obata et al. |
| 2011/0128477 A1* | 6/2011 | Izaki et al. .................. 349/96 |
| 2011/0177314 A1 | 7/2011 | Tatami et al. |
| 2011/0194048 A1* | 8/2011 | Izaki et al. .................. 349/62 |
| 2011/0199561 A1 | 8/2011 | Hasegawa et al. |
| 2011/0297990 A1 | 12/2011 | Shimizu et al. |
| 2012/0015169 A1 | 1/2012 | Ohta |
| 2012/0057230 A1 | 3/2012 | Murakami et al. |
| 2012/0113356 A1 | 5/2012 | Yu et al. |
| 2012/0113671 A1 | 5/2012 | Sadasivan et al. |
| 2012/0121824 A1 | 5/2012 | Toyama et al. |
| 2012/0189831 A1 | 7/2012 | Kawasaki et al. |
| 2012/0229732 A1 | 9/2012 | Koike et al. |
| 2012/0250142 A1 | 10/2012 | Kobuchi et al. |
| 2013/0039031 A1 | 2/2013 | Asano et al. |
| 2013/0100378 A1 | 4/2013 | Murata et al. |
| 2013/0194211 A1 | 8/2013 | Shinohara et al. |
| 2013/0272020 A1 | 10/2013 | Koide et al. |
| 2013/0301130 A1 | 11/2013 | Nakamura et al. |
| 2014/0028625 A1 | 1/2014 | Maeda et al. |
| 2014/0104519 A1 | 4/2014 | Murata et al. |
| 2014/0232951 A1 | 8/2014 | Ueda et al. |
| 2014/0293197 A1 | 10/2014 | Shin et al. |
| 2015/0131038 A1 | 5/2015 | Ishiguro et al. |
| 2015/0131043 A1 | 5/2015 | Yamamoto et al. |
| 2015/0168779 A1 | 6/2015 | Kim et al. |
| 2015/0316696 A1 | 11/2015 | Kamijo et al. |
| 2015/0331282 A1 | 11/2015 | Yamada et al. |
| 2016/0011355 A1 | 1/2016 | Kokudo et al. |
| 2016/0048057 A1 | 2/2016 | Sekiguchi et al. |
| 2016/0209564 A1 | 7/2016 | Kuroda |

FOREIGN PATENT DOCUMENTS

| | | |
|---|---|---|
| CN | 1495925 A | 5/2004 |
| CN | 1623107 A | 6/2005 |
| CN | 1641897 A | 7/2005 |
| CN | 1656399 A | 8/2005 |
| CN | 1839176 A | 9/2006 |
| CN | 1892360 A | 1/2007 |
| CN | 1916667 A | 2/2007 |
| CN | 1927996 A | 3/2007 |
| CN | 1957273 A | 5/2007 |
| CN | 101113309 A | 1/2008 |
| CN | 101156092 A | 4/2008 |
| CN | 101273465 A | 9/2008 |
| CN | 101358144 A | 2/2009 |
| CN | 101661190 A | 3/2010 |
| CN | 101799564 A | 8/2010 |
| EP | 2871055 A1 | 5/2015 |
| JP | S14-018675 Y | 11/1939 |
| JP | S49-060317 A | 6/1974 |
| JP | S51-066163 U | 5/1976 |
| JP | S52-010100 A | 1/1977 |
| JP | S54-139921 A | 10/1979 |
| JP | S56-033611 A | 4/1981 |
| JP | S58-098709 A | 6/1983 |
| JP | S58-143305 A | 8/1983 |
| JP | S59-077401 A | 5/1984 |
| JP | S60-026304 A | 2/1985 |
| JP | S60-097323 A | 5/1985 |
| JP | S60-133402 U | 9/1985 |
| JP | S62-135338 A | 6/1987 |
| JP | S63-226603 A | 9/1988 |
| JP | S63-307403 A | 12/1988 |
| JP | H03-125302 U1 | 12/1991 |
| JP | H04-163138 A | 6/1992 |

(56) References Cited

FOREIGN PATENT DOCUMENTS

| | | |
|---|---|---|
| JP | 04-224811 A | 8/1992 |
| JP | H04-256903 A | 9/1992 |
| JP | H06-051117 A | 2/1994 |
| JP | 06-258634 A | 9/1994 |
| JP | H08-101307 A | 4/1996 |
| JP | H08-162070 A | 6/1996 |
| JP | 08-271733 A | 10/1996 |
| JP | 08-271734 A | 10/1996 |
| JP | 09-033722 A | 2/1997 |
| JP | H09-033920 A | 2/1997 |
| JP | H09-097017 A | 4/1997 |
| JP | 09-166711 A | 6/1997 |
| JP | H09-169950 A | 6/1997 |
| JP | 09-314782 A | 12/1997 |
| JP | 10-010522 A | 1/1998 |
| JP | H10-010558 A | 1/1998 |
| JP | 10-107325 A | 4/1998 |
| JP | H10-133817 A | 5/1998 |
| JP | H10-161108 A | 6/1998 |
| JP | 10-242513 A | 9/1998 |
| JP | H10-268270 A | 10/1998 |
| JP | 11-070629 A | 3/1999 |
| JP | H11-301104 A | 11/1999 |
| JP | 2000-082335 A | 3/2000 |
| JP | 2000-082338 A | 3/2000 |
| JP | 2000-141530 A | 5/2000 |
| JP | 2000-162419 A | 6/2000 |
| JP | 2000-206333 A | 7/2000 |
| JP | 2000-208815 A | 7/2000 |
| JP | 2000-231450 A | 8/2000 |
| JP | 2000-296595 A | 10/2000 |
| JP | 2001-026762 A | 1/2001 |
| JP | 2001-059907 A | 3/2001 |
| JP | 2001-116926 A | 4/2001 |
| JP | 2001-141922 A | 5/2001 |
| JP | 2001-181568 A | 7/2001 |
| JP | 2002-231032 A | 8/2001 |
| JP | 2001-272534 A | 10/2001 |
| JP | 2001-272682 A | 10/2001 |
| JP | 2001-334623 A | 12/2001 |
| JP | 2002-071921 A | 3/2002 |
| JP | 2002-088334 A | 3/2002 |
| JP | 2002-509283 A | 3/2002 |
| JP | 2002-116320 A | 4/2002 |
| JP | 2002-116877 A | 4/2002 |
| JP | 2002-198573 A | 7/2002 |
| JP | 2003-121818 A | 4/2003 |
| JP | 2003-121819 A | 4/2003 |
| JP | 2003-179259 A | 6/2003 |
| JP | 2004-005540 A | 1/2004 |
| JP | 2004-009362 A | 1/2004 |
| JP | 2004-037841 A | 2/2004 |
| JP | 2004-170875 A | 6/2004 |
| JP | 2004-189957 A | 7/2004 |
| JP | 2004-205773 A | 7/2004 |
| JP | 2004-214069 A | 7/2004 |
| JP | 2004-219620 A | 8/2004 |
| JP | 2004-226591 A | 8/2004 |
| JP | 2004-226734 A | 8/2004 |
| JP | 2004-237451 A | 8/2004 |
| JP | 2004-252082 A | 9/2004 |
| JP | 2004-361774 A | 12/2004 |
| JP | 2005-114990 A | 4/2005 |
| JP | 2005-148519 A | 6/2005 |
| JP | 2005-157082 A | 6/2005 |
| JP | 2005-173462 A | 6/2005 |
| JP | 2005-181450 A | 7/2005 |
| JP | 2005-265889 A | 9/2005 |
| JP | 2005-266464 A | 9/2005 |
| JP | 2005-317985 A | 11/2005 |
| JP | 2005-321543 A | 11/2005 |
| JP | 2005-352068 A | 12/2005 |
| JP | 2006-062281 A | 3/2006 |
| JP | 2006-079067 A | 3/2006 |
| JP | 2006-106427 A | 4/2006 |
| JP | 2006-133652 A | 5/2006 |
| JP | 2006-205579 A | 8/2006 |
| JP | 2006-205668 A | 8/2006 |
| JP | 2006-215107 A | 8/2006 |
| JP | 2006-215175 A | 8/2006 |
| JP | 2006-251294 A | 9/2006 |
| JP | 2006-276574 A | 10/2006 |
| JP | 2006-276697 A | 10/2006 |
| JP | 2006-301592 A | 11/2006 |
| JP | 2006-335853 A | 12/2006 |
| JP | 2007039535 A * | 2/2007 |
| JP | 2007-055222 A | 3/2007 |
| JP | 2007-059360 A | 3/2007 |
| JP | 2007-086722 A | 4/2007 |
| JP | 2007-152932 A | 6/2007 |
| JP | 2007-171707 A | 7/2007 |
| JP | 2007-233114 A | 9/2007 |
| JP | 2007-253512 A | 10/2007 |
| JP | 2007-279243 A | 10/2007 |
| JP | 2007-279469 A | 10/2007 |
| JP | 2007-286447 A | 11/2007 |
| JP | 2007-304391 A | 11/2007 |
| JP | 2008-003425 A | 1/2008 |
| JP | 2008-030370 A | 2/2008 |
| JP | 2008-052067 A | 3/2008 |
| JP | 2008-083115 A | 4/2008 |
| JP | 2008-132768 A | 6/2008 |
| JP | 2008-155435 A | 7/2008 |
| JP | 2008-160140 A | 7/2008 |
| JP | 2008-163078 A | 7/2008 |
| JP | 2008-192620 A | 8/2008 |
| JP | 2008-208223 A | 9/2008 |
| JP | 2008-537803 A | 9/2008 |
| JP | 2008-256747 A | 10/2008 |
| JP | 2008-266392 A | 11/2008 |
| JP | 2008-281866 A | 11/2008 |
| JP | 2009-006543 A | 1/2009 |
| JP | 2009-014886 A | 1/2009 |
| JP | 2009-102573 A | 5/2009 |
| JP | 2009-109995 A | 5/2009 |
| JP | 2009-139526 A | 6/2009 |
| JP | 2009-143226 A | 7/2009 |
| JP | 2009-157347 A | 7/2009 |
| JP | 2009-157348 A | 7/2009 |
| JP | 2009-157361 A | 7/2009 |
| JP | 2009-160830 A | 7/2009 |
| JP | 2009-169389 A | 7/2009 |
| JP | 2009160830 A * | 7/2009 |
| JP | 2009-175685 A | 8/2009 |
| JP | 2009-251035 A | 10/2009 |
| JP | 2009-269174 A | 11/2009 |
| JP | 2009-269301 A | 11/2009 |
| JP | 2009-282424 A | 12/2009 |
| JP | 2009-288395 A | 12/2009 |
| JP | 2009-294675 A | 12/2009 |
| JP | 2009-300611 A | 12/2009 |
| JP | 2009-300955 A | 12/2009 |
| JP | 2010-026112 A | 2/2010 |
| JP | 2010-032718 A | 2/2010 |
| JP | 2010-044200 A | 2/2010 |
| JP | 2010-054750 A | 3/2010 |
| JP | 2010-054913 A | 3/2010 |
| JP | 2010-046816 A | 4/2010 |
| JP | 2010-079481 A | 4/2010 |
| JP | 2010-080290 A | 4/2010 |
| JP | 2010-096948 A | 4/2010 |
| JP | 2010-107892 A | 5/2010 |
| JP | 2010-113054 A | 5/2010 |
| JP | 2010-139938 A | 6/2010 |
| JP | 2010-209126 A | 9/2010 |
| JP | 2010-217844 A | 9/2010 |
| JP | 2010-224345 A | 10/2010 |
| JP | 2010-224512 A | 10/2010 |
| JP | 2010-243630 A | 10/2010 |
| JP | 2010-244059 A | 10/2010 |
| JP | 2010-271509 A | 12/2010 |
| JP | 2010-277028 A | 12/2010 |
| JP | 2011-005854 A | 1/2011 |
| JP | 2011-007830 A | 1/2011 |

(56) References Cited

FOREIGN PATENT DOCUMENTS

| | | |
|---|---|---|
| JP | 2011-008169 A | 1/2011 |
| JP | 2011-008170 A | 1/2011 |
| JP | 2011-011364 A | 1/2011 |
| JP | 2011-013402 A | 1/2011 |
| JP | 2011-028945 A | 2/2011 |
| JP | 2011-053271 A | 3/2011 |
| JP | 2011-059488 A | 3/2011 |
| JP | 2011-067952 A | 4/2011 |
| JP | 2011-081359 A | 4/2011 |
| JP | 2011-088429 A | 5/2011 |
| JP | 2011-090042 A | 5/2011 |
| JP | 2011-099089 A | 5/2011 |
| JP | 2011-107198 A | 6/2011 |
| JP | 2011-110718 A | 6/2011 |
| JP | 2011-126158 A | 6/2011 |
| JP | 2011-140139 A | 7/2011 |
| JP | 2011-140140 A | 7/2011 |
| JP | 2011-167914 A | 9/2011 |
| JP | 2011-181875 A | 9/2011 |
| JP | 2011-186290 A | 9/2011 |
| JP | 2011-195692 A | 10/2011 |
| JP | 2011-208147 A | 10/2011 |
| JP | 2011-215295 A | 10/2011 |
| JP | 2011-215646 A | 10/2011 |
| JP | 2012-003007 A | 1/2012 |
| JP | 2012-003259 A | 1/2012 |
| JP | 2012-025027 A | 2/2012 |
| JP | 2012-025850 A | 2/2012 |
| JP | 2012-083744 A | 4/2012 |
| JP | 2012-091336 A | 5/2012 |
| JP | 2012-103470 A | 5/2012 |
| JP | 4962661 B2 | 6/2012 |
| JP | 2012-198879 A | 10/2012 |
| JP | 5051328 B1 | 10/2012 |
| JP | 2012-214026 A | 11/2012 |
| JP | 2012-214056 A | 11/2012 |
| JP | 2012-215623 A | 11/2012 |
| JP | 2012-215724 A | 11/2012 |
| JP | 2012-220879 A | 11/2012 |
| JP | 2012-256014 A | 12/2012 |
| JP | 2013-003952 A | 1/2013 |
| JP | 2013-029919 A | 2/2013 |
| JP | 4888853 B2 | 2/2013 |
| JP | 2013-054207 A | 3/2013 |
| JP | 2013-079993 A | 5/2013 |
| JP | 2013-109116 A | 6/2013 |
| JP | 2013-539598 A | 10/2013 |
| JP | 2013-254171 A | 12/2013 |
| JP | 5370601 B1 | 12/2013 |
| JP | 2014-010315 A | 1/2014 |
| JP | 2014-010316 A | 1/2014 |
| JP | 2014-011318 A | 1/2014 |
| JP | 2014-012373 A | 1/2014 |
| JP | 2014-013367 A | 1/2014 |
| JP | 2014-015035 A | 1/2014 |
| JP | 2014-016590 A | 1/2014 |
| JP | 2014-016591 A | 1/2014 |
| JP | 2014-032275 A | 2/2014 |
| JP | 2014-044389 A | 3/2014 |
| JP | 2014-170223 A | 9/2014 |
| JP | 2014-215473 A | 11/2014 |
| JP | 2014-219438 A | 11/2014 |
| JP | 2015-055680 A | 3/2015 |
| JP | 2015-094903 A | 5/2015 |
| JP | 2015-141346 A | 8/2015 |
| JP | 2015-215577 A | 12/2015 |
| JP | 2015-224267 A | 12/2015 |
| JP | 2016-021000 A | 2/2016 |
| JP | 2016-504632 A | 2/2016 |
| KR | 2003-0060787 A | 7/2003 |
| KR | 2006-0056995 A | 5/2006 |
| KR | 2010-0048187 A | 5/2010 |
| KR | 2010-0078564 A | 7/2010 |
| KR | 20110014515 A | 2/2011 |
| KR | 10-1337005 B1 | 12/2013 |
| TW | 575501 B | 2/2004 |
| TW | 200428041 A | 12/2004 |
| TW | 200704686 A | 2/2007 |
| TW | 200819871 A | 5/2008 |
| TW | 200827787 A | 7/2008 |
| TW | 200831962 A | 8/2008 |
| TW | 200931083 A | 7/2009 |
| TW | 201017236 A | 5/2010 |
| TW | 2010-22016 A | 6/2010 |
| TW | 201022794 A | 6/2010 |
| TW | 201035605 A | 10/2010 |
| TW | 201043675 A | 12/2010 |
| TW | 201128264 A | 8/2011 |
| TW | 201131218 A | 9/2011 |
| TW | 201142380 A | 12/2011 |
| TW | 201205160 A | 2/2012 |
| TW | 201207012 A | 2/2012 |
| TW | 201300893 A | 1/2013 |
| WO | WO 1999/036814 A1 | 6/1999 |
| WO | WO 2000/007046 A1 | 2/2000 |
| WO | WO 2003/074611 A1 | 9/2003 |
| WO | WO 2005/050269 A1 | 6/2005 |
| WO | WO 2006/113164 A1 | 10/2006 |
| WO | WO 2007/020909 A1 | 2/2007 |
| WO | WO 2007/023929 A1 | 3/2007 |
| WO | WO 2008/047785 A1 | 4/2008 |
| WO | WO 2010/050355 A1 | 5/2010 |
| WO | WO 2010/079555 A1 | 7/2010 |
| WO | WO 2010/110549 A2 | 9/2010 |
| WO | WO 2011/030757 A1 | 3/2011 |
| WO | WO 2011/058774 A1 | 5/2011 |
| WO | WO 2011/114884 A1 | 9/2011 |
| WO | WO 2011/162198 A1 | 12/2011 |
| WO | WO 2012/021643 A2 | 2/2012 |
| WO | WO 2012/026192 A1 | 3/2012 |
| WO | WO 2012/033141 A1 | 3/2012 |
| WO | WO 2012/049977 A1 | 4/2012 |
| WO | WO 2012/141147 A1 | 10/2012 |
| WO | WO 2012/157662 A1 | 11/2012 |
| WO | WO 2012/157663 A1 | 11/2012 |
| WO | WO 2013/069162 A1 | 5/2013 |
| WO | WO 2013/080949 A1 | 6/2013 |
| WO | WO 2013/100042 A1 | 7/2013 |
| WO | WO 2013/187134 A1 | 12/2013 |
| WO | WO 2014/021242 A1 | 2/2014 |
| WO | WO 2014/042022 A1 | 3/2014 |
| WO | WO 2014/132726 A1 | 9/2014 |
| WO | WO 2014/203894 A1 | 12/2014 |
| WO | WO 2014/208519 A1 | 12/2014 |

OTHER PUBLICATIONS

Japanese Patent Office, Notice of Information Offer in Japanese Patent Application No. 2012-132122 (dated Jul. 15, 2014).
European Patent Office, Extended European Search Report in European Patent Application No. 12786442.9 (dated Nov. 4, 2014).
Ishikawa, Kenji, "3D Stereoscopic Images Are Coming," Ohmsa Ltd., pp. 62-118 (Apr. 25, 2010).
Kobayashi et al., 58th SPSJ Annual Meeting, *Polymer Preprints*, Japan, 58(1): 1362 (May 12, 2009).
Kobayashi et al., 58th SPSJ Symposium on Macromolecules, *Polymer Preprints*, Japan, 58(2): 4144 (Sep. 1, 2009).
Kobayashi et al., *The Fifteenth Microoptics Conference, Technical Digest*, pp. 30- 31 (Oct. 25, 2009).
Kobayashi et al., "A Novel High Retardation Polymer Film for Liquid Crystal Displays," FMCp-31, pp. 871-874, presented at 16th International Display Workshops (IDW '09), World Convention Center Summit, Miyazaki, Japan, pp. 1-209 and cover pp. (Dec. 9-11, 2009).
Japanese Patent Office, Office Action in Japanese Patent Application No. 2009-259054 (dated Aug. 3, 2010).
Japanese Patent Office, Office Action in Japanese Patent Application No. 2009-259054 (dated May 24, 2011).
Japanese Patent Office, Office Action in Japanese Patent Application No. 2011-160702 (dated Apr. 10, 2012).
Japanese Patent Office, International Search Report in International Application No. PCT/JP2012/083848 (dated Apr. 2, 2013).

(56) References Cited

OTHER PUBLICATIONS

Japanese Patent Office, International Search Report in International Patent Application No. PCT/JP2010/057956 (dated Aug. 10, 2010).
Japanese Patent Office, International Search Report in International Patent Application No. PCT/JP2011/064026 (dated Jul. 12, 2011).
Japanese Patent Office, International Search Report in International Patent Application No. PCT/JP2012/062476 (dated Jun. 26, 2012).
Japanese Patent Office, International Search Report in International Patent Application No. PCT/JP2012/062477 (dated Jul. 10, 2012).
Japanese Patent Office, International Search Report in International Patent Application No. PCT/JP2013/071201 (dated Sep. 10, 2013).
Japanese Patent Office, International Search Report in International Patent Application No. PCT/JP2013/070428 (dated Oct. 15, 2013).
Japanese Patent Office, Notice of Reasons for Rejection in Japanese Patent Application No. 2011-160702 (dated Apr. 2, 2013).
Japanese Patent Office, Notice of Observations by Third Parties in Japanese Patent Application No. 2011-160702 (dated Jul. 2, 2013).
Japanese Patent Office, International Search Report in International Patent Application No. PCT/JP2012/083849 (dated Mar. 12, 2013).
Japanese Patent Office, International Search Report in International Patent Application No. PCT/JP2012/083853 (dated Mar. 19, 2013).
Japanese Patent Office, Decision of Rejection in Japanese Patent Application No. 2012-132122 (dated Jan. 13, 2015).
European Patent Office, Extended European Search Report in European Patent Application 12785180.6 (dated Jan. 30, 2015).
European Patent Office, Extended European Search Report in European Patent Application 14186320.9 (dated Dec. 22, 2014).
Japanese Patent Office, Notice of Reasons for Rejection in Japanese Patent Application No. 2012-132122 (dated Dec. 3, 2013).
Japanese Patent Office, International Search Report in International Patent Application No. PCT/JP2014/052850 (dated Mar. 4, 2014).
Hirosaki et al., "White Light-emitting Diode Lamps for Lighting Applications," *Fujikura Technical Journal*, 109: 1-4 (Oct. 2005).
National Institute for Materials Science, "Success in Trial Production of White LED for Liquid Crystal Backlight—Improvement in Color Reproducibility of Liquid Crystal Display," Press Release (Mar. 19, 2008).
NEC, "LED Performance Required for Liquid Crystal Display for Industrial Use and LED B/L Technology," *NEC Technical Journal*, vol. 60, No. Mar. 2007 (Sep. 2007).
Sharp Corporation, "LED Device for Liquid Crystal TV Backlight," Sharp *Technical Journal*, 99: 20-22 (Aug. 2009).
Tanaka, Kazushi, "Current Status and Future Perspective of Liquid Crystal Related Market in 2008, vol. 2," pp. 379-382 (Fuji Chimera Research Institute, Inc., Jul. 28, 2008).
Japanese Patent Office, Submission of Information by a Third Party in Japanese Patent Application No. 2012-132122 (dated Jan. 28, 2014).
Japanese Patent Office, Notice of Reasons for Rejection in Japanese Patent Application No. 2012-132122 (dated Apr. 8, 2014).
Japanese Patent Office, International Search Report in International Patent Application No. PCT/JP2014/052849 (dated Apr. 28, 2014).
Japanese Patent Office, International Search Report in International Patent Application No. PCT/JP2014/062301 (dated Jul. 8, 2014).
Japanese Patent Office, International Search Report in International Patent Application No. PCT/JP2014/060377 (dated Jun. 24, 2014).
Taiwan Patent Office, Notification for the Opinions of Examination in Taiwanese Patent Application No. 101144456 (dated Mar. 20, 2015).
Taiwan Patent Office, Notification for the Opinion of Examination in Taiwanese Patent Application No. 102127019 (dated Apr. 10, 2015).
Wikipedia, "Backlight" (Dec. 4, 2015) [available on the internet at: https://en.wikipedia.org/wiki/Backlight].
European Patent Office, Communication Pursuant to Rule 114(2) EPC in European Patent Application No. 14186320.9 (dated Nov. 18, 2015).
Japanese Patent Office, Notification of Reasons for Refusal in Japanese Patent Application No. 2012-174967 (dated Mar. 8, 2016).
Japanese Patent Office, Notification of Reasons for Refusal in Japanese Patent Application No. 2012-174968 (dated Mar. 8, 2016).
Japanese Patent Office, Notification of Reasons for Refusal in Japanese Patent Application No. 2012-174969 (dated Mar. 8, 2016).
Japanese Patent Office, Notification of Reasons for Refusal in Japanese Patent Application No. 2012-175930 (dated Mar. 8, 2016).
Japanese Patent Office, Notification of Reasons for Refusal in Japanese Patent Application No. 2012-198501 (dated Mar. 29, 2016).
Chinese Patent Office, The First Office Action in Chinese Patent Application No. 201280058791.2 (dated Dec. 3, 2015).
Chinese Patent Office, Third Office Action in Chinese Patent Application No. 201280024048.5 (dated Oct. 17, 2016).
Japanese Patent Office, International Search Report in International Patent Application No. PCT/JP2016/070384 (dated Sep. 20, 2016).
Japanese Patent Office, Notification of Reasons for Refusal in Japanese Patent Application No. 2013-028260 (dated Oct. 4, 2016).
Japanese Patent Office, Notification of Reasons for Refusal in Japanese Patent Application No. 2013-028263 (dated Oct. 4, 2016).
Japanese Patent Office, Notice of Reasons for Revocation in Japanese Patent No. 5789564 (dated Oct. 26, 2016).
Japanese Patent Office, Notification of Reasons for Refusal in Japanese Patent Application No. 2013-027745 (dated Nov. 15, 2016).
Japanese Patent Office, Notification of Reasons for Refusal in Japanese Patent Application No. 2013-028054 (dated Nov. 15, 2016).
Japanese Patent Office, Notification of Reasons for Refusal in Japanese Patent Application No. 2013-028062 (dated Nov. 15, 2016).
Japanese Patent Office, Notification of Reasons for Refusal in Japanese Patent Application No. 2013-027736 (dated Nov. 22, 2016).
Japanese Patent Office, Notification of Reasons for Refusal in Japanese Patent Application No. 2013-027743 (dated Nov. 22, 2016).
Japanese Patent Office, Notification of Reasons for Refusal in Japanese Patent Application No. 2013-027754 (dated Nov. 22, 2016).
Japanese Patent Office, Notification of Reasons for Refusal in Japanese Patent Application No. 2013-027755 (dated Nov. 22, 2016).
Japanese Patent Office, Notification of Reasons for Refusal in Japanese Patent Application No. 2013-028290 (dated Nov. 22, 2016).
Japanese Patent Office, Notification of Reasons for Refusal in Japanese Patent Application No. 2013-551788 (dated Dec. 6, 2016).
Chinese Patent Office, Fourth Office Action in Chinese Patent Application No. 201180030818.2 (dated Nov. 2, 2016).
European Patent Office, Communication pursuant to Article 94(3) EPC in European Patent Application No. 11798082.1 (dated Nov. 14, 2016).
European Patent Office, Communication pursuant to Article 94(3) EPC in European Patent Application No. 14186320.9 (dated Nov. 14, 2016).
Japanese Patent Office, Notification of Reasons for Refusal in Japanese Patent Application No. 2013-027750 (dated Nov. 22, 2016).
Japanese Patent Office, Notification of Reasons for Refusal in Japanese Patent Application No. 2013-027738 (dated Nov. 29, 2016).
Japanese Patent Office, Notification of Reasons for Refusal in Japanese Patent Application No. 2013-028157 (dated Nov. 29, 2016).
Japanese Patent Office, Notification of Reasons for Refusal in Japanese Patent Application No. 2013-028161 (dated Nov. 29, 2016).
Japanese Patent Office, Notification of Reasons for Refusal in Japanese Patent Application No. 2013-028271 (dated Dec. 20, 2016).
Japanese Patent Office, Notification of Reasons for Refusal in Japanese Patent Application No. 2013-028349 (dated Dec. 20, 2016).

(56) References Cited

OTHER PUBLICATIONS

Japanese Patent Office, Notification of Reasons for Refusal in Japanese Patent Application No. 2013-028365 (dated Dec. 20, 2016).
Japanese Patent Office, Notification of Reasons for Refusal in Japanese Patent Application No. 2013-028378 (dated Dec. 20, 2016).
Japanese Patent Office, Notification of Reasons for Refusal in Japanese Patent Application No. 2013-253161 (dated Dec. 20, 2016).
Japanese Patent Office, Notification of Reasons for Refusal in Japanese Patent Application No. 2014-006636 (dated Dec. 20, 2016).
Japanese Patent Office, Notification of Reasons for Refusal in Japanese Patent Application No. 2014-017181 (dated Dec. 27, 2016).
Japanese Patent Office, Notification of Reasons for Refusal in Japanese Patent Application No. 2016-063353 (dated Dec. 27, 2016).
Japanese Patent Office, Notification of Reasons for Refusal in Japanese Patent Application No. 2013-028384 (dated Jan. 4, 2017).
Japanese Patent Office, Notification of Reasons for Refusal in Japanese Patent Application No. 2013-181235 (dated Jan. 10, 2017).
Japanese Patent Office, Notification of Reasons for Refusal in Japanese Patent Application No. 2013-253159 (dated Jan. 10, 2017).
Japanese Patent Office, Notification of Reasons for Refusal in Japanese Patent Application No. 2013-102468 (dated Jan. 24, 2017).
Japanese Patent Office, Notification of Reasons for Refusal in Japanese Patent Application No. 2013-060416 (dated Jan. 17, 2017).
Japanese Patent Office, Notification of Reasons for Refusal in Japanese Patent Application No. 2013-103941 (dated Jan. 17, 2017).
Japanese Patent Office, Notification of Reasons for Refusal in Japanese Patent Application No. 2014-012284 (dated Jan. 17, 2017).
Japanese Patent Office, Notification of Reasons for Refusal in Japanese Patent Application No. 2013-103844 (dated Jan. 24, 2017).
Japanese Patent Office, International Search Report in International Patent Application No. PCT/JP2016/084524 (dated Jan. 31, 2017).
Japanese Patent Office, Notification of Reasons for Refusal in Japanese Patent Application No. 2013-105035 (dated Feb. 14, 2017).
Japanese Patent Office, Notification of Reasons for Refusal in Japanese Patent Application No. 2012-284081 (dated Aug. 2, 2016).
Japanese Patent Office, Notification of Reasons for Refusal in Japanese Patent Application No. 2012-284085 (dated Sep. 6, 2016).
Japanese Patent Office, Notification of Reasons for Refusal in Japanese Patent Application No. 2013-023667 (dated Oct. 4, 2016).
Japanese Patent Office, Notification of Reasons for Refusal in Japanese Patent Application No. 2013-027735 (dated Oct. 4, 2016).
Dic Color Design, Inc., "XYZ Color System" (2015) [obtained at http://www.dic-color.com/knowledge/xyz.html].
Japan Industrial Standard (JIS) Z 8701, "Color Display Method by XYZ Color System and $X_{10}Y_{10}Z_{10}$ Color System," Specification of Colours According to the CIE 1931—Standard Colorimetric System and the CIE 1964—Supplementary Standard Colorimetric System, pp. 111-119 (1982).
Kato, *Jour. Geol. Soc. Japan*, 107(1): 64-67 (Jan. 2001).
Kirk-Othmer, *Concise Encyclopedia of Chemical Technology*, "Film and Sheeting Materials," p. 1159 (1988).
Ministry of Internal Affairs and Communications, *Japan Standard Industrial Classification*, "Manufacturing industries of plastic films, sheets, floor materials, and artificial leather," item 182 (revised Oct. 2013—enforced Apr. 1, 2014).
Nagatsuka et al., *Nitto Technical Journal*, 27(1): 46-53 (May 1989).

Japanese Patent Office, Notice of Dispatch for Duplicate Patent Opposition in Japanese Opposition No. 2016-700225, Dispatch No. 042937, in Japanese Patent 5789564 (dated May 13, 2016).
Japanese Patent Office, Notice of Dispatch for Duplicate Patent Opposition in Japanese Opposition No. 2016-700225, Dispatch No. 042941, in Japanese Patent 5789564 (dated May 13, 2016).
Japanese Patent Office, International Search Report in International Patent Application No. PCT/JP2016/056336 (dated May 10, 2016).
Japanese Patent Office, International Search Report in International Patent Application No. PCT/JP2016/059301 (dated Jun. 14, 2016).
Japanese Patent Office, Notification of Reasons for Refusal in Japanese Patent Application No. 2012-284048 (dated Jun. 14, 2016).
Japanese Patent Office, Notification of Reasons for Refusal in Japanese Patent Application No. 2012-284049 (dated Jul. 5, 2016).
Fukuda et al., "New Green-Emitting Sialon-Based Phosphor for White LEDs," *Toshiba Review*, 64(4): 60-63 (2009).
Japanese Patent Office, Notice on Information Offer Form in Japanese Patent Application No. 2011-160702 (dated Jan. 29, 2013).
Japanese Patent Office, Notification of Reasons for Refusal in Japanese Patent Application No. 2013-106235 (dated Dec. 20, 2016).
Ukai, "Introduction to Flat Panel Display (6) FPD to Components and Materials Technology (1) Touch Panel," *The Chemical Times*, 2011(4): 2-7 (2011).
Olympus Corporation, "Series II: Basis of Polarization Analysis," obtained from Olympus Corporation website (Jul. 13, 2009).
Saito, "Illustrated Basis of Optics," *Electronics Series*, First Edition, Nikkan Kogyo Shimbun Ltd. (publisher), pp. 154-157 (Nov. 25, 2011).
Japanese Patent Office, Notification of Reasons for Refusal in Japanese Patent Application No. 2012-174966 (dated Apr. 26, 2016).
Japanese Patent Office, Notification of Reasons for Refusal in Japanese Patent Application No. 2012-198500 (dated May 10, 2016).
Japanese Patent Office, Notification of Reasons for Refusal in Japanese Patent Application No. 2012-171990 (dated Oct. 4, 2016).
Japanese Patent Office, Notification of Reasons for Refusal in Japanese Patent Application No. 2012-174966 (dated Nov. 29, 2016).
Japanese Patent Office, Notification of Reasons for Refusal in Japanese Patent Application No. 2012-198500 (dated Jan. 24, 2017).
Japanese Patent Office, Notification of Reasons for Refusal in Japanese Patent Application No. 2016-063352 (dated Jan. 31, 2017).
Japanese Patent Office, Notification of Reasons for Refusal in Japanese Patent Application No. 2012-284081 (dated Mar. 7, 2017).
Japanese Patent Office, Notification of Reasons for Refusal in Japanese Patent Application No. 2013-106236 (dated Mar. 14, 2017).
Hartlove, "Quantum Dots Unleash High Color Gamut Performance in LED-Backlit Displays," *LEDs Magazine Japan*, pp. 14-16 (Dec. 2011).
Korean Patent Office, Notification of Reasons for Refusal in Korean Patent Application No. 10-2016-7031805 (dated Mar. 20, 2017).
Chinese Patent Office, The First Office Action in Chinese Patent Application No. 201480027949.9 (dated Jun. 2, 2017).
Japanese Patent Office, International Search Report in International Patent Application No. PCT/JP2017/011981 (dated Jun. 6, 2017).
Japanese Patent Office, Notification of Reasons for Refusal in Japanese Patent Application No. 2013-028259 (dated Feb. 6, 2018).
Japanese Patent Office, Notification of Reasons for Refusal in Japanese Patent Application No. 2013-028260 (dated Feb. 6, 2018).
Japanese Patent Office, Notification of Reasons for Refusal in Japanese Patent Application No. 2013-028263 (dated Feb. 6, 2018).
Kikutani et al., "Methods of Birefringence Measurement and Examples of Data Analysis," *Seni Gakkaishi*, 66(1): 39-44 (2010).
Japanese Patent Office, Notification of Reasons for Refusal for Japanese Patent Application No. 2013-228154 (dated Mar. 27, 2018).

(56) References Cited

OTHER PUBLICATIONS

Japanese Patent Office, Notification of Reasons for Refusal for Japanese Patent Application No. 2017-127016 (dated Mar. 20, 2018).
Chinese Patent Office, The Second Office Action in Chinese Patent Application No. 201610447870.2 (dated Jan. 24, 2018).
Yamaoka (editor-in-chief), Dictionary of Optical Application Technologies and Materials, p. 362 ("Phase difference/protective film integrated polarizing plate (Fig. 5.1.17)") (Sangyo-Gijutsu Service Center Co., Ltd. (publishing company), 2006).
Japanese Patent Office, Notification of Reasons for Refusal in Japanese Patent Application No. 2017-157901 (dated Jul. 3, 2018).
Japanese Patent Office, Decision of Refusal in Japanese Patent Application No. 2014-543689 (dated Apr. 24, 2018).
U.S. Appl. No. 13/509,211, filed May 10, 2012.
U.S. Appl. No. 13/806,023, filed Dec. 20, 2012.
U.S. Appl. No. 14/118,115, filed Nov. 15, 2013.
U.S. Appl. No. 15/476,339, filed Mar. 31, 2017.
U.S. Appl. No. 15/861,186, filed Jan. 3, 2018.
U.S. Appl. No. 16/102,345, filed Aug. 13, 2018.
Olympus Corporation, "Learn More About Microscopes/Learn about polarizing microscopes from the basics/2nd Issue: Basic Polarization Analysis," pp. 3-4 [downloaded from http://microscopelabo.jp/learn/009/index_2.html] (Mar. 1, 2017).
Yasue, "Chapter 8: Polarization," Feynman Physics II (published by Iwanami Shoten), 32nd revision, pp. 87-90 (Feb. 5, 1996).
Japanese Patent Office, Office Action in Japanese Patent Application No. 2013-027749 (dated Aug. 28, 2018).
Japanese Patent Office, Decision of Refusal in Japanese Patent Application No. 2014-525242 (dated Sep. 18, 2018).
Japanese Patent Office, Report of Consideration by Examiner before Appeal in Appeal No. 2018-010109 in Japanese Patent Application No. 2014-543689 (dated Oct. 30, 2018).
Japanese Patent Office, Report of Reconsideration by Examiner before Appeal in Appeal No. 2018-012616 for Japanese Patent Application No. 2016-239613 (dated Nov. 6, 2018).
Japanese Patent Office, Notification of Reasons for Refusal in Japanese Patent Application No. 2018-001046 (dated Nov. 20, 2018)

\* cited by examiner

LIQUID CRYSTAL DISPLAY DEVICE, POLARIZING PLATE, AND POLARIZER PROTECTION FILM

CROSS-REFERENCE TO RELATED APPLICATIONS

This patent application is the U.S. national phase of International Patent Application No. PCT/JP2012/062477, filed May 16, 2012, which claims the benefit of Japanese Patent Application No. 2011-111441, filed on May 18, 2011, each of which is incorporated by reference in its entirety herein.

TECHNICAL FIELD

The present invention relates to a liquid crystal display device, a polarizer (polarizing plate), and a protective film. More specifically, the present invention relates to a liquid crystal display device that ensures high visibility and can be made thinner, and to a polarizer and a protective film suitable for the liquid crystal display device.

BACKGROUND ART

Polarizers used in liquid crystal display devices (LCDs) generally have a structure in which a polarizing film obtained by dyeing polyvinyl alcohol (PVA), etc., with iodine is sandwiched between two protective films. Triacetyl cellulose (TAC) films are commonly used as the protective films. Along with the recent trend toward thinner LCDs, there is a demand for reducing the thickness of the polarizers. However, when the thickness of a TAC film is reduced, problems such as lower mechanical strength and higher moisture permeability occur. Moreover, since TAC films are relatively expensive, inexpensive alternative materials are strongly desired.

To address this situation, there is a proposal to use polyester films, which have relatively high durability despite their thinness, in place of TAC films (PTL 1 to PTL 3).

TAC films, the surface of which is treated with alkali, etc., have a very high affinity for hydrophilic adhesives and have very high adhesion to polarizing films coated with a hydrophilic adhesive. In contrast, polyester films have insufficient adhesion to hydrophilic adhesives. In particular, this tendency is more prominent in polyester films having orientation due to a stretching treatment. Accordingly, PTL 2 and PTL 3 propose providing an easy-bonding layer in a polyester film in order to improve the adhesion of the polyester film to a polarizing film or a hydrophilic adhesive applied to the polarizing film.

CITATION LIST

Patent Literature

PTL 1: JP2002-116320A
PTL 2: JP2004-219620A
PTL 3: JP2004-205773A

SUMMARY OF INVENTION

Technical Problem

As described above, polyester films are superior in durability to TAC films; however, unlike TAC films, polyester films have birefringence. Therefore, the use of polyester films as protective films causes problematic lower image quality due to optical distortion. That is, polyester films having birefringence have a specific optical anisotropy (retardation); therefore, when they are used as protective films, rainbow unevenness is observed from an oblique direction, and image quality deteriorates. Hence, PTL 1 to PTL 3 attempt to reduce the retardation by using copolymerized polyester as the polyester. However, even such an attempt has failed to completely prevent rainbow unevenness.

Furthermore, polyester films have a low affinity for water, and polyester films having crystal orientation due to stretching have an even lower affinity for water. On the other hand, the polarizing film or an adhesive applied to the polarizing film comprises a polyvinyl alcohol resin as a main component and has high hydrophilicity. Due to the differences in their characteristics, oriented polyester films and the polarizing film or the adhesive have a low affinity for each other, making it difficult to bond them firmly. For this reason, even the adhesion-facilitating layers disclosed in Patent Documents 2 and 3 do not have sufficient adhesion, compared to triacetyl cellulose films. Therefore, when a polarizer comprising conventional orientated polyethylene terephthalate films as its protective films was used as a display member for a long period of time, floating and peeling occurred between the protective films and the polarizing film, the change in the moisture content of the polarizing film deteriorated polarization properties, and visibility was lowered because of white spots, etc.

The present invention was made to solve these problems. An object of the present invention is to provide a liquid crystal display device that can be made thinner and that has improved visibility, and a polarizer and a protective film suitable for the liquid crystal display device.

Solution to Problem

The present inventors conducted intensive studies on the mechanism of rainbow unevenness that occurs when using a polyester film as a protective film. The results revealed that the rainbow unevenness was attributable to the retardation of the polyester film and the emission spectrum of the backlight light source. Conventionally, fluorescent tubes, such as cold-cathode tubes and hot-cathode tubes, are commonly used as backlight light sources of liquid crystal display devices. The spectral distribution of fluorescent lamps, such as cold-cathode tubes and hot-cathode tubes, shows emission spectra having a plurality of peaks. These discontinuous emission spectra are combined to provide a white light source. In contrast, when a film having a high retardation transmits light, transmission intensity varies depending on the wavelength of the light. Accordingly, when the backlight light source has discontinuous emission spectra, only light of a specific wavelength is intensively transmitted, presumably leading to the occurrence of rainbow unevenness.

Based on these findings, the present inventors conceived that the above problems can be solved by using, in combination, a specific backlight light source and a polyester film having a specific retardation, and further using an adhesion-facilitating layer having a specific binder composition. This idea has been demonstrated, thereby leading to the completion of the present invention.

That is, the present invention includes the following inventions set forth in items (1) to (10) below:

Item 1.

A liquid crystal display device comprising a backlight light source, two polarizers, and a liquid crystal cell disposed between the two polarizers, wherein the backlight light source is a white light-emitting diode light source, wherein each of the two polarizers comprises a polarizing film and protective films laminated on both sides of the polarizing film, wherein at least one of the protective films is a polyester film having an adhesion-facilitating layer, wherein the polyester film has a retardation of 3,000 to 30,000 nm, and wherein the adhesion-facilitating layer comprises a polyester resin (A) and a polyvinyl alcohol resin (B).

Item 2.

The liquid crystal display device according to item 1, wherein the protective film on the light-outgoing side of the polarizing film of the polarizer disposed on the light-outgoing side with respect to the liquid crystal cell is the polyester film having an adhesion-facilitating layer.

Item 3.

The liquid crystal display device according to item 1 or 2, wherein the polyester film has a ratio of retardation to thickness-direction retardation (Re/Rth) of 0.2 or more and 1.2 or less.

Item 4.

The liquid crystal display device according to any one of items 1 to 3, wherein the polyester film has, on the surface opposite to the surface in contact with the polarizing film, one or more layers selected from the group consisting of a hard-coat layer, an antiglare layer, an antireflection layer, a low-reflection layer, a low-reflection antiglare layer, and an antireflection antiglare layer.

Item 5.

A polarizer for use in a liquid crystal display device comprising a white light-emitting diode as a backlight light source, wherein the polarizer comprises a polarizing film and protective films laminated on both sides of the polarizing film, wherein at least one of the protective films is a polyester film having an adhesion-facilitating layer, wherein the polyester film has a retardation of 3,000 to 30,000 nm, and wherein the adhesion-facilitating layer comprises a polyester resin (A) and a polyvinyl alcohol resin (B). Item 6.

The polarizer for use in a liquid crystal display device comprising a white light-emitting diode as a backlight light source according to item 5, wherein the polyester film has, on the surface opposite to the surface in contact with the polarizing film, one or more layers selected from the group consisting of a hard-coat layer, an antiglare layer, an antireflection layer, a low-reflection layer, a low-reflection antiglare layer, and an antireflection antiglare layer.

Item 7.

A protective film for use in a liquid crystal display device comprising a white light-emitting diode as a backlight light source, wherein the film comprises a polyester film that has an adhesion-facilitating layer comprising a polyester resin (A) and a polyvinyl alcohol resin (B), and that has a retardation of 3,000 to 30,000 nm.

Item 8.

The protective film for use in a liquid crystal display device comprising a white light-emitting diode as a backlight light source according to item 7, wherein the polyester film has a ratio of retardation to thickness-direction retardation (Re/Rth) of 0.2 or more and 1.2 or less.

Item 9.

The protective film for use in a liquid crystal display device comprising a white light-emitting diode as a backlight light source according to item 7 or 8, wherein the polyester film comprises at least three or more layers, contains an ultraviolet absorber in the layer other than the outermost layers, and has a light transmittance at 380 nm of 20% or less.

Item 10.

The protective film for use in a liquid crystal display device comprising a white light-emitting diode as a backlight light source according to any one of items 7 to 9, wherein the polyester film has, on the surface opposite to the surface in contact with the polarizing film, one or more layers selected from the group consisting of a hard-coat layer, an antiglare layer, an antireflection layer, a low-reflection layer, a low-reflection antiglare layer, and an antireflection antiglare layer.

Advantageous Effects of Invention

The liquid crystal display device, polarizer, and protective film of the present invention have an excellent adhesion between the polarizing film and the protective films, allow the transmitted light to have a spectrum approximated to that of the light source at any observation angle, and ensure excellent visibility without rainbow unevenness.

DESCRIPTION OF EMBODIMENTS

In general, a liquid crystal panel comprises a back module, a liquid crystal cell, and a front module in this order, starting from the side opposing a backlight light source to the side on which an image is displayed (i.e., the light-outgoing side). The back module and the front module each ordinarily include a transparent substrate, a transparent conductive film formed on the surface of the transparent substrate on the liquid crystal cell side, and a polarizer disposed on the opposite side. In this regard, the polarizer in the back module is disposed on the side opposing the backlight light source, and the polarizer in the front module is disposed on the side on which an image is displayed (i.e., the light-outgoing side).

The liquid crystal display device of the present invention comprises, as components, at least a backlight light source, two polarizers, and a liquid crystal cell disposed between the polarizers. Furthermore, as long as visibility and the adhesion between the polarizing film and the protective films are not impaired, the liquid crystal display device may appropriately comprise, in addition to the above components, other components, such as a color filter, a lens film, an optical diffusion sheet, and an antireflection film.

The structure of the backlight may be an edge-light system comprising a light guide plate, a reflector, etc., as components, or a direct under-light system; however, in the present invention, it is necessary to use white light-emitting diodes (white LEDs) as the backlight light source of the liquid crystal display device. The white LEDs refer to organic light-emitting diodes (OLEDs), or phosphor-based devices, that is, devices that emit white light by the combined use of phosphors with light-emitting diodes using compound semiconductors to emit blue light or ultraviolet light. Among phosphors, white light-emitting diodes comprising light-emitting devices obtained by the combined use of yttrium-aluminum-garnet yellow phosphors with blue light-emitting diodes using compound semiconductors are suitable as the backlight light source of the present invention because of their continuous and wide emission spectrum and excellent luminous efficiency. Moreover, organic light-emitting diodes are also suitable because of their continuous and wide emission spectrum. A continuous and wide emission spectrum means that the emission spectrum is continuous in the visible light range, and that there is no wavelength at which the light intensity of the emission spectrum is zero, at least in a wavelength region of 450 to 650 nm.

The liquid crystal display device of the present invention uses white LEDs, which consume low power; therefore, it can attain the effect of energy conservation.

In relation to this, a type of LED that utilizes the combination of red-emitting, green-emitting, and blue-emitting LEDs as a white light source (three-color LED system) has also been put to practical use. However, this method is not preferred, because it provides a narrow and discontinuous emission spectrum; therefore, it is expected to be difficult to obtain the desired effect of the present invention.

In addition, fluorescent tubes, such as cold-cathode tubes and hot-cathode tubes, which have hitherto been widely used as backlight light sources, only have a discontinuous emission spectrum with peaks at specific wavelengths; therefore, it is difficult to obtain the desired effect of the present invention.

The polarizer has a structure in which a polarizing film prepared by dyeing PVA, etc., with iodine is bonded between two protective films. In the present invention, at least one of the protective films, which constitute the polarizer, is a polyester film having a specific range of retardation.

Although not wishing to be bound by any theory, the mechanism for preventing the occurrence of rainbow unevenness by the above structure is considered to be as follows.

When a polyester film having birefringent properties is disposed on one side of the polarizing film, linearly polarized light emitted from the polarizing film is disturbed when passing through the polymer film. The transmitted light shows an interference color specific to the retardation of the polymer film, which is the product of the birefringence and the thickness thereof. Accordingly, when cold-cathode tubes, hot-cathode tubes, or the like that have a discontinuous emission spectrum are used as the light source, the intensity of the transmitted light varies depending on the wavelength, causing rainbow unevenness (refer to pages 30 and 31 of Proceedings of the 15th Microoptics Conference).

In contrast, white light-emitting diodes have a continuous and wide emission spectrum in the visible light region. Therefore, when focusing on the envelope curve shape of the interference color spectrum of light transmitted through a birefringent material, a spectrum similar to the emission spectrum of the light source can be obtained by controlling the retardation of the polyester film. It is thus considered that rainbow unevenness is not generated, and visibility is significantly improved, because the envelope curve shape of the interference color spectrum of the light transmitted through the birefringent material becomes similar to the emission spectrum of the light source.

As described above, since the present invention uses white light-emitting diodes having a wide emission spectrum as the light source, the envelope curve shape of the spectrum of the transmitted light can be approximated to the emission spectrum of the light source with only a relatively simple structure.

To attain the above effect, the polyester film used as the protective film is preferably an oriented polyester film having a retardation of 3,000 to 30,000 nm. If a polyester film having a retardation of less than 3,000 nm is used as the protective film, a strong interference color is presented when observed from an oblique direction. This makes the envelope curve shape dissimilar to the emission spectrum of the light source; therefore, excellent visibility cannot be ensured. The lower limit of the retardation is preferably 4,500 nm, more preferably 6,000 nm, still more preferably 8,000 nm, and even more preferably 10,000 nm.

On the other hand, the upper limit of the retardation is 30,000 nm. A polyester film having a retardation of higher than 30,000 nm is not preferred. This is because the use of such a polyester film cannot substantially attain the effect of further improving visibility, while also leading to a considerable increase in the thickness of the film. This reduces the handling ability of the film as an industrial material.

The retardation of the polyester film can be determined by measuring refractive indices in two mutually orthogonal directions and thickness, or can also be determined using a commercially available automatic birefringence analyzer, such as KOBRA-21ADH (Oji Scientific Instruments).

In the present invention, at least one of the protective films has the above specific retardation. The position of the protective film having the specific retardation in the liquid crystal display device is not particularly limited as long as excellent visibility is obtained; however, it is preferable that the protective film on the light source side of the polarizing film of the polarizer disposed on the light source side of the liquid crystal, or the protective film on the light-outgoing side of the polarizing film of the polarizer disposed on the light-outgoing side of the liquid crystal, be a polyester film having the specific retardation. In particular, it is more preferable that the protective film on the light-outgoing side of the polarizing film of the polarizer disposed on the light-outgoing side of the liquid crystal be a polyester film having the specific retardation. If the polyester film is disposed in a position other than the above-described positions, the polarization properties of the liquid crystal cell may be changed. Since the polymer film of the present invention cannot be used in a place for which polarization properties are required, the polymer film of the present invention is preferably used only in such a limited position.

The polarizer of the present invention has a structure in which a polarizing film prepared by dyeing polyvinyl alcohol (PVA), etc., with iodine is bonded between two protective films, at least either of which has the above specific retardation. The other protective film is preferably a birefringence-free film, typified by TAC films, acrylic films, and norbornene films.

The polarizer used in the present invention can be provided with various functional layers so as to prevent background reflections, glare, scratches, and so on. Examples of such functional layers include, but are not limited to, a hard-coat layer, an antiglare (AG) layer, an antireflection (AR) layer, a low-reflection (LR) layer, a low-reflection antiglare (LR/AG) layer, and an antireflection antiglare (AR/AG) layer. Functional layers are preferably provided on the surface of the polyester film (the surface of the polyester film opposite to the surface in contact with the polarizing film). Only one of these layers may be formed on the polyester film, or a combination of two or more layers may be laminated, as necessary.

When various functional layers are provided, it is preferable to provide an adhesion-facilitating layer on the surface of the oriented polyester film. In that case, in terms of preventing the interference of reflected light, it is preferable to adjust the refractive index of the adhesion-facilitating layer to be close to the geometric mean of the refractive index of the functional layers and the refractive index of the polyester film. The refractive index of the adhesion-facilitating layer can be adjusted by a known method, for example, by incorporating titanium, zirconium, or other metal species into a binder resin, such as polyester or polyurethane.

The polyester used in the present invention may be polyethylene terephthalate or polyethylene naphthalate, but may contain other copolymerization components. The resins of these materials have excellent transparency, and also have excellent thermal and mechanical properties. This makes it possible to easily control the retardation by a stretching treatment. In particular, polyethylene terephthalate is preferable, because it has high intrinsic birefringence, and therefore can relatively easily provide great retardation, even if the thickness of the film is small.

In order to prevent degradation of the optical functional dye, such as iodine dye, the film of the present invention preferably has a light transmittance at a wavelength of 380 nm of 20% or less. The light transmittance at 380 nm is more preferably 15% or less, still more preferably 10% or less, and particularly preferably 5% or less. When the above light transmittance is 20% or less, the degradation of the optical functional dye caused by ultraviolet light can be prevented. In addition, the transmittance in the present invention is a value measured vertically with respect to the plane of the film, and can be measured with a spectrophotometer (e.g., Hitachi U-3500 spectrophotometer).

In order to adjust the transmittance of the film of the present invention at a wavelength of 380 nm to 20% or less, it is preferable to suitably control the type and concentration of the ultraviolet absorber, and the thickness of the film. The ultraviolet absorber used in the present invention is a known substance. Examples of the ultraviolet absorber include organic ultraviolet absorbers and inorganic ultraviolet absorbers; however, organic ultraviolet absorbers are preferred in terms of transparency. Specific examples of organic ultraviolet absorbers include benzotriazole-based ultraviolet absorbers, benzophenone-based ultraviolet absorbers, and cyclic imino ester-based ultraviolet absorbers. These ultraviolet absorbers can be used singly or in combination of two or more, as long as the above range of absorbance can be obtained. When two or more ultraviolet absorbers are used in combination, ultraviolet lights of different wavelengths can be absorbed at the same time. Thus, the ultraviolet absorption effect can be further improved. Benzotriazole-based ultraviolet absorbers and cyclic imino ester-based ultraviolet absorbers are particularly preferred in terms of durability.

Examples of benzophenone-based ultraviolet absorbers, benzotriazole-based ultraviolet absorbers, and acrylonitrile-based ultraviolet absorbers include 2-[2'-hydroxy-5'-(methacryloyloxymethyl)phenyl]-2H-benzotriazole, 2-[2'-hydroxy-5'-(methacryloyloxyethyl)phenyl]-2H-benzotriazole, 2-[2'-hydroxy-5'-(methacryloyloxypropyl)phenyl]-2H-benzotriazole, 2,2'-dihydroxy-4,4'-dimethoxybenzophenone, 2,2',4,4'-tetrahydroxybenzophenone, 2,4-di-tert-butyl-6-(5-chlorobenzotriazol-2-yl)phenol, 2-(2'-hydroxy-3'-tert-butyl-5'-methylphenyl)-5-chlorobenzotriazole, 2-(5-chloro(2H)-benzotriazol-2-yl)-4-methyl-6-(tert-butyl)phenol, 2,2'-methylenebis(4-(1,1,3,3-tetramethylbutyl)-6-(2H-benzotriazol-2-yl)phenol), etc. Examples of cyclic imino ester-based ultraviolet absorbers include 2,2'-(1,4-phenylene)bis(4H-3,1-benzoxazin-4-one), 2-methyl-3,1-benzoxazin-4-one, 2-butyl-3,1-benzoxazin-4-one, 2-phenyl-3,1-benzoxazin-4-one, etc. However, ultraviolet absorbers are not limited to these examples.

In addition to the ultraviolet absorber, various additives other than catalysts can be added in the range where the effect of the present invention is not impaired. Examples of such additives include inorganic particles, heat-resistant polymer particles, alkali metal compounds, alkaline earth metal compounds, phosphorus compounds, antistatic agents, light-resistant agents, flame retardants, heat stabilizers, antioxidants, anti-gelling agents, surfactants, etc. Moreover, in order to achieve high transparency, it is also preferable that the polyester film does not substantially contain particles. "Not substantially contain particles" indicates that, for example, in the case of inorganic particles, the content of inorganic elements quantified by X-ray fluorescence analysis is 50 ppm or less, preferably 10 ppm or less, and particularly preferably not greater than the detection limit.

In order to improve the adhesion of the polyester film to the polarizing film or a polyvinyl alcohol resin layer (e.g., a water-based adhesive) provided in one side or both sides of the polarizing film, an adhesion-facilitating layer comprising a resin composition containing a polyester resin (A) and a polyvinyl alcohol resin (B) is laminated on at least one side of the polyester film. The adhesion-facilitating layer may be formed on both sides of the polyester film; or the adhesion-facilitating layer may be formed on only one side of the polyester film, and a coating layer of a different resin may be formed on the other side. The polyester resin (A) imparts adhesion to the base film, while the polyvinyl alcohol resin (B) imparts adhesion to the polarizing film or water-based adhesive, thus ensuring excellent adhesion to both layers.

The polyester resin (A) used in the adhesion-facilitating layer of the present invention is a copolymer obtained by polycondensation of a dicarboxylic acid component and a diol component. Usable materials for the dicarboxylic acid component and the diol component are described later. In terms of enhancing the adhesion to the polyester film base, it is preferable to use, as the dicarboxylic acid component of the polyester resin (A), a dicarboxylic acid component whose structure and properties are identical or similar to those of the dicarboxylic acid component in the polyester film. Therefore, for example, when an aromatic dicarboxylic acid is used as the dicarboxylic acid component of the polyester film, it is preferable to use an aromatic dicarboxylic acid as the dicarboxylic acid component of the polyester resin (A). The most preferable aromatic dicarboxylic acid components are terephthalic acid and isophthalic acid. Other aromatic dicarboxylic acids may be added and copolymerized in an amount of 10 mol % or less based on the total dicarboxylic acid component.

The material of the polyester resin (A) may be, but is not limited to, a copolymer obtained by polycondensation of a dicarboxylic acid component and a diol component; and a blended resin thereof. Examples of the dicarboxylic acid component include terephthalic acid, isophthalic acid, orthophthalic acid, 2,5-naphthalenedicarboxylic acid, 2,6-naphthalenedicarboxylic acid, 1,4-naphthalenedicarboxylic acid, 1,5-naphthalenedicarboxylic acid, diphenylcarboxylic acid, diphenoxyethanedicarboxylic acid, diphenylsulfonecarboxylic acid, anthracenedicarboxylic acid, 1,3-cyclopentanedicarboxylic acid, 1,3-cyclohexanedicarboxylic acid, 1,4-cyclohexanedicarboxylic acid, hexahydroterephthalic acid, hexahydroisophthalic acid, malonic acid, dimethylmalonic acid, succinic acid, 3,3-diethylsuccinic acid, glutaric acid, 2,2-dimethylglutaric acid, adipic acid, 2-methyladipic acid, trimethyladipic acid, pimelic acid, azelaic acid, dimer acid, sebacic acid, suberic acid, and dodecadicarboxylic acid. These may be used singly or in combination of two or more.

Examples of the diol component constituting the polyester resin (A) include ethylene glycol, propylene glycol, hexamethylene glycol, neopentyl glycol, 1,2-cyclohexanedimethanol, 1,4-cyclohexanedimethanol, decamethylene glycol, 1,3-propanediol, 1,4-butanediol, 1,5-pentanediol, 1,6-hexadiol, 2,2-bis(4-hydroxyphenyl)propane, and bis(4-hydroxyphenyl)sulfone. These may be used singly or in combination of two or more.

Moreover, the glycol component of the polyester resin (A) is preferably a combination of ethylene glycol and branched glycol. A branched structure is considered to contribute to stress relaxation in the adhesion-facilitating layer, resulting in excellent adhesion. Examples of the branched glycol component include 2,2-dimethyl-1,3-propanediol, 2-methyl-2-ethyl-1,3-propanediol, 2-methyl-2-butyl-1,3-propanediol, 2-methyl-2-propyl-1,3-propanediol, 2-methyl-2-isopropyl-1,3-propanediol, 2-methyl-2-n-hexyl-1,3-propanediol, 2,2-diethyl-1,3-propanediol, 2-ethyl-2-n-butyl-1,3-propanediol, 2-ethyl-2-n-hexyl-1,3-propanediol, 2,2-di-n-butyl-1,3-propanediol, 2-n-butyl-2-propyl-1,3-propanediol, and 2,2-di-n-hexyl-1,3-propanediol. These may be used singly or in combination of two or more.

The lower limit of the molar ratio of the branched glycol component to the total glycol component is preferably 10 mol %, and particularly preferably 20 mol %. On the other hand, the upper limit is preferably 80 mol %, more preferably 70 mol %, and particularly preferably 60 mol %. If necessary, diethylene glycol, propylene glycol, butanediol, hexanediol, 1,4-cyclohexanedimethanol, or the like, may be used in combination.

The polyester resin (A) used in the present invention is preferably a water-soluble or water-dispersible resin in terms of the compatibility with the polyvinyl alcohol resin (B). In order to make the polyester resin water-soluble or water-dispersible, it is preferable to copolymerize a compound containing a hydrophilic group, such as a sulfonic acid salt group or a carboxylic acid salt group. In particular, dicarboxylic acid components having a sulfonic acid salt group are preferable in terms of imparting hydrophilicity while maintaining the acid value of the polyester resin (A) at a low level and controlling reactivity with a crosslinking agent. Examples of dicarboxylic acid components having a sulfonic acid salt group include sulfoterephthalic acid, 5-sulfoisophthalic acid, 4-sulfonaphthaleneisophthalic acid-2,7-dicarboxylic acid, 5-(4-sulfophenoxy)isophthalic acid, and alkali metal salts thereof; among which 5-sulfoisophthalic acid is preferred. The amount of the dicarboxylic acid component having a sulfonic acid salt group is preferably 1 to 15 mol %, more preferably 1.5 to 12 mol %, and even more preferably 2 to 10 mol %, in the dicarboxylic acid component of the polyester resin (A). An amount of the dicarboxylic acid component having a sulfonic acid salt group equal to or greater than the above lower limit is suitable for making the polyester resin water-soluble or water-dispersible. An amount of the dicarboxylic acid component having a sulfonic acid salt group equal to or less than the above upper limit is suitable for adhesion to the polyester film base.

When a crosslinking agent (C) is used in combination, as described later, the polyester resin (A) preferably has a smaller amount of carboxylic acid group, which is reactive with the crosslinking agent (C). It is considered that the polyester resin (A) having a smaller amount of carboxyl group reactive with the crosslinking agent results in less reactivity with the crosslinking agent, and consequently incompletely mixed with the polyvinyl alcohol resin, whereby a domain structure formed by the crosslinked polyvinyl alcohol resin is maintained. From such a viewpoint, the acid value of the polyester resin (A) is desirably 20 KOHmg/g or less, preferably 15 KOHmg/g or less, more preferably 10 KOHmg/g or less, even more preferably 8 KOHmg/g or less, and still more preferably 5 KOHmg/g or less. The acid value of the polyester resin (A) can be theoretically determined from the results of component analysis by a later-described titration method, NMR, or the like.

In order to control the acid value of the polyester resin (A) within the above range, it is preferable to reduce the amount of carboxylic acid salt group that is introduced to make the resin water-soluble or water-dispersible, to use hydrophilic groups other than carboxylate groups, or to reduce the terminal carboxylic acid concentration of the polyester resin. The terminal carboxylic acid concentration of the polyester resin is preferably reduced by using a polyester resin in which the terminal carboxylic acid group has been modified, or using a polyester resin having a large number average molecular weight. Accordingly, the number average molecular weight of the polyester resin (A) is preferably 5,000 or more, more preferably 6,000 or more, and even more preferably 10,000 or more. It is also preferable to reduce the content of acid component(s) having three or more carboxyl groups as a constituent component of the polyester resin (A).

The glass transition temperature of the polyester resin (A) is preferably, but is not limited to, 20 to 90° C., and more preferably 30 to 80° C. A glass transition temperature equal to or greater than the above lower limit is suitable for blocking resistance, while a glass transition temperature equal to or less than the above upper limit is suitable for adhesion to the polyester film base.

The polyester resin (A) content of the adhesion-facilitating layer is preferably 40 mass % or more and 90 mass % or less, more preferably 45 mass % or more and 85 mass % or less, and even more preferably 50 mass % or more and 80 mass % or less. A polyester resin (A) content equal to or greater than the above lower limit is suitable for adhesion to the polyester film base, whereas a polyester resin (A) content equal to or less than the above upper limit is suitable for adhesion to the polarizing film or water-based resin.

Examples of the polyvinyl alcohol resin (B) in the adhesion-facilitating layer include, but are not limited to, polyvinyl alcohol obtained by saponification of polyvinyl acetate; derivatives thereof; saponified copolymer of vinyl acetate and a monomer copolymerizable with vinyl acetate; modified polyvinyl alcohol obtained by acetalization, urethanization, etherification, grafting, or phosphorylation of polyvinyl alcohol; and the like. Examples of the monomer include (anhydrous) maleic acid, fumaric acid, crotonic acid, itaconic acid, (meth)acrylic acid, and other unsaturated carboxylic acids, and esters thereof; ethylene, propylene, and other α-olefins; (meth)allylsulfonic acid (soda), sulfonic acid soda (monoalkyl malate), disulfonic acid soda alkyl malate, N-methylolacrylamide, acrylamide alkyl sulfonic acid alkali salts, N-vinylpyrrolidone, N-vinylpyrrolidone derivatives, and the like. These polyvinyl alcohol resins may be used singly or in combination of two or more.

Examples of the polyvinyl alcohol resin (B) used in the present invention include vinyl alcohol-vinyl acetate copolymers, vinyl alcohol-vinyl butyral copolymers, and ethylene-vinyl alcohol copolymers; among which vinyl alcohol-vinyl acetate copolymers and ethylene-vinyl alcohol copolymers are preferred. Although the degree of polymerization of the polyvinyl alcohol resin (B) is not limited, the degree of polymerization is preferably 3,000 or less, in terms of the viscosity of the coating solution.

The copolymerization ratio of vinyl alcohol is represented by the degree of saponification. The degree of saponification of the polyvinyl alcohol resin (B) of the present invention is preferably 60 mol % or more and 85 mol % or less, more preferably 65 mol % or more and 83 mol % or less, still more preferably 68 mol % or more and 80 mol % or less, even more preferably 70 mol % or more and less than 80 mol %, still even more preferably 71 mol % or more and 78 mol % or less, and particularly preferably 73 mol % or more and 75 mol % or less. When a crosslinking agent (C) is used in combination, as described later, a degree of saponification of the polyvinyl alcohol resin (B) equal to or greater than the above lower limit facilitates the formation of a crosslinked structure with the crosslinking agent (C). In contrast, a degree of saponification of the polyvinyl alcohol resin (B) equal to or less than (or below) the above upper limit enhances compatibility with the polyester resin (A). The degree of saponification of the vinyl alcohol resin can be determined by the alkali consumption required for hydrolysis of copolymerization units, such as vinyl acetate, or by composition analysis by NMR.

The polyvinyl alcohol resin (B) content of the adhesion-facilitating layer is preferably 10 mass % or more and 60 mass % or less, more preferably 15 mass % or more and 55 mass % or less, and even more preferably 20 mass % or more and 50 mass % or less. A polyvinyl alcohol resin (B) content greater than the above lower limit is suitable for adhesion to the polarizing film and water-based resin, whereas a polyvinyl alcohol resin (B) content less than the above upper limit is suitable for adhesion to the polyester film base.

Examples of the crosslinking agent (C) include melamine-, isocyanate-, carbodiimide, oxazoline-, and epoxy-based compounds, but are not limited thereto as long as they are crosslinkable with hydroxyl groups. In terms of the stability of the coating solution over time, melamine-, isocyanate-, carbodiimide-, and oxazoline-based compounds are preferred. Further preferred crosslinking agents are melamine-based compounds and isocyanate-based compounds that are preferably crosslinkable with the hydroxyl group of the polyvinyl alcohol resin (B). This is presumably because since carbodiimide-based crosslinking agents are reactive with carboxyl groups, while melamine-based compounds or isocyanate-based compounds are reactive with hydroxyl groups, these compounds can more suitably form a crosslinked structure with the polyvinyl alcohol resin (B), which has a hydroxyl group as a functional group. In particular, isocyanate-based compounds are preferred, because they are suitably crosslinked with the hydroxyl group of the polyvinyl alcohol resin and have excellent transparency. Further, a catalyst and the like may be appropriately used, if necessary, in order to promote the crosslinking reaction.

When the crosslinking agent (C) is used in combination, it is preferable, as described above, to combine a polyester resin (A) having an acid value of 20 KOHmg/g or less, a polyvinyl alcohol resin (B) having a degree of saponification of 60 to 85 mol %, and the crosslinking agent (C). Although not wishing to be bound by any theory, the above combination is considered to enable the polyester resin and the polyvinyl alcohol resin to more suitably form individual domain units in the adhesion-facilitating layer, thereby forming a phase separation structure, which is generally called a sea-island structure. The separated structures of such domain units are considered to more suitably ensure both the adhesion of the domain formed by the polyester resin to the polyester film and the adhesion of the domain formed by the polyvinyl alcohol resin to the polyvinyl alcohol resin layer, without impairing both of these two functions. The crosslinking agent (C) presumably promotes and maintains the formation of the domain structure by crosslinking and aggregating the polyvinyl alcohol resin (B).

Usable isocyanate compounds are low- and high-molecular-weight diisocyanates, and trivalent or higher polyisocyanates. Specific examples of isocyanate compounds include aromatic diisocyanates, such as 2,4-tolylene diisocyanate, 2,6-tolylene diisocyanate, 4,4'-diphenylmethane diisocyanate, 2,4'-diphenylmethane diisocyanate, 2,2'-diphenylmethane diisocyanate, 1,5-naphthylene diisocyanate, 1,4-naphthylene diisocyanate, phenylene diisocyanate, tetramethylxylylene diisocyanate, 4,4'-diphenylether diisocyanate, 2-nitrodiphenyl-4,4'-diisocyanate, 2,2'-diphenylpropane-4,4'-diisocyanate, 3,3'-dimethyldiphenylmethane-4,4'-diisocyanate, 4,4'-diphenylpropanediisocyanate, and 3,3'-dimethoxydiphenyl-4,4'-diisocyanate; aromatic aliphatic diisocyanates, such as xylylene diisocyanate; alicyclic diisocyanates, such as isophorone diisocyanate, 4,4-dicyclohexylmethane diisocyanate, and 1,3-bis(isocyanatemethyl)cyclohexane; aliphatic diisocyanates, such as hexamethylene diisocyanate and 2,2,4-trimethylhexamethylene diisocyanate; and trimers of these isocyanate compounds. Other examples are terminal isocyanate group-containing macromolecular compounds obtained by reacting an excess amount of such an isocyanate compound with a low-molecular-weight active hydrogen compound, such as ethylene glycol, propylene glycol, trimethylolpropane, glycerin, sorbitol, ethylenediamine, monoethanolamine, diethanolamine, or triethanolamine; or with a high-molecular-weight active hydrogen compound, such as polyester polyols, polyether polyols, or polyamides. These may be used singly or in combination of two or more.

A blocked isocyanate compound is also preferred as the crosslinking agent (C). The addition of a blocked isocyanate compound can more suitably improve the stability of the coating solution over time.

A blocked isocyanate compound can be prepared by the addition reaction of an aforementioned isocyanate compound and a blocking agent using a known method. Examples of isocyanate blocking agents include phenols, such as phenol, cresol, xylenol, resorcinol, nitrophenol, and chlorophenol; thiophenols, such as thiophenol and methylthiophenol; oximes, such as acetoxime, methylethylketoxime, and cyclohexanone oxime; alcohols, such as methanol, ethanol, propanol, and butanol; halogen-substituted alcohols, such as ethylenechlorohydrin and 1,3-dichloro-2-propanol; tertiary alcohols, such as t-butanol and t-pentanol; lactams, such as ε-caprolactam, δ-valerolactam, γ-butyrolactam, and β-propyllactam; aromatic amines; imides; active methylene compounds, such as acetylacetone, acetoacetic acid ester, and malonic acid ethyl ester; mercaptans; imines; ureas; diaryl compounds; sodium bisulfite; and the like.

Usable melamine compounds are those substituted with a substituent —$(CH_2)_n$—O—R, wherein n is an integer of 1 to 3, and R is $C_{1-4}$ alkyl, preferably methyl. The number of substituents of one melamine structure is preferably 3 to 6. Specific examples of melamine compounds include the Sumitex Resin series M-3, MK, M-6, M-100, and MC (produced by Sumitomo Chemical Co., Ltd.), methylated melamine resins MW-22, MX-706, and MX-042 (produced by Sanwa Chemical Co., Ltd.), and the like.

The crosslinking agent (C) content of the adhesion-facilitating layer is preferably 2 mass % or more and 50 mass % or less, more preferably 5 mass % or more and 40 mass % or less, and even more preferably 8 mass % or more and 30 mass % or less. A crosslinking agent (C) content equal to or greater than the above lower limit is suitable for crosslink formation of the polyvinyl alcohol resin, whereas a crosslinking agent (C) content equal to or less than the above upper limit is suitable for expression of the adhesion effect by the binder resin.

The mixing ratio (A)/(B) of the polyester resin (A) to the polyvinyl alcohol resin (B) is preferably 0.8 to 5, more preferably 1 to 4, even more preferably 2 to 4, and particularly preferably 2.5 to 3.5, by mass ratio. An (A)/(B) ratio equal to or greater than the above lower limit is suitable for adhesion to the polyester film base, whereas an (A)/(B) ratio equal to or less than the above upper limit is suitable for adhesion to the polarizing film or water-based resin.

The mixing ratio ((A)+(B))/(C) of the polyester resin (A) and the polyvinyl alcohol resin (B) to the crosslinking agent (C) is preferably 2 to 50, more preferably 5 to 40, and even more preferably 8 to 30, by mass ratio. An ((A)+(B))/(C) ratio equal to or greater than the above lower limit is suitable for expression of the adhesion effect by the binder resin component, whereas an ((A)+(B))/(C) ratio equal to or less than the above upper limit is suitable for expression of the adhesion effect due to phase separation.

Because of the above composition, the adhesion-facilitating layer of the present invention has adhesion as high as that of triacetyl cellulose to the polarizing film or water-based adhesive, particularly when the polarizing film or water-based adhesive comprises polyvinyl alcohol. More specifically, in an adhesion test, described later, the area of the remaining polarizing film after one peeling is preferably 80% or more, more preferably 90% or more, even more preferably 95% or more, and most preferably 100%.

Further, as for the above adhesion, the remaining area after 5 continuous peelings and the remaining area after 10 peelings are preferably as follows. The remaining area after 5 continuous peelings is preferably 75% or more, more preferably 85% or more, and even more preferably 95% or more. The remaining area after 10 continuous peelings is preferably 50% or more, more preferably 80% or more, even more preferably 90% or more, still more preferably 93% or more, and particularly preferably 95% or more.

The adhesion-facilitating layer of the present invention may contain known additives, such as surfactants, antioxidants, catalysts, heat-resistant stabilizers, weathering stabilizers, ultraviolet absorbers, organic lubricants, pigments, dye, organic or inorganic particles, antistatic agents, and nucleating agents, in the range where the effect of the present invention is not impaired.

In a preferable embodiment of the present invention, particles are added to the adhesion-facilitating layer so as to improve the blocking resistance of the adhesion-facilitating layer. In the present invention, examples of the particles to be added to the adhesion-facilitating layer include inorganic particles of titanium oxide, barium sulfate, calcium carbonate, calcium sulfate, silica, alumina, talc, kaolin, clay, calcium phosphate, mica, hectorite, zirconia, tungsten oxide, lithium fluoride, calcium fluoride, or the like; and styrene, acrylic, melamine, benzoguanamine, silicone, and other organic polymer particles. These particles may be used singly or in combination of two or more.

The average particle diameter of the particles in the adhesion-facilitating layer (average particle diameter based on the number of particles measured by SEM; hereafter the same) is preferably 0.04 to 2.0 µm, and more preferably 0.1 to 1.0 µm. Inert particles having an average particle diameter of less than 0.04 µm result in insufficient formation of irregularities on the film surface. Consequently, the handling properties of the film, such as sliding properties and winding properties, may be reduced, and processability during bonding may be lowered. Inert particles having an average particle diameter of more than 2 µm are not preferred because they tend to easily drop out. The particle concentration in the adhesion-facilitating layer is preferably 1 to 20 mass %, and more preferably 5 to 15 mass %, in the solid components.

In the present invention, the thickness of the adhesion-facilitating layer can be suitably determined within the range of 0.001 to 2 µm; however, in order to achieve both processability and adhesion, the thickness is preferably in the range of 0.01 to 1 µm, more preferably 0.02 to 0.8 µm, and even more preferably 0.05 to 0.5 µm. When the thickness of the adhesion-facilitating layer is less than 0.01 µm, adhesion becomes insufficient. When the thickness of the adhesion-facilitating layer is more than 2 µm, blocking may occur.

In a general method for producing polyester films, for example, non-oriented polyester obtained by melting a polyester resin and extruding the molten resin into a sheet-like shape is stretched in a longitudinal direction through the use of roll velocity difference at a temperature higher than the glass transition temperature, and then stretched in a transverse direction with a tenter, followed by heat treatment.

The method for providing the adhesion-facilitating layer may be a known method. Examples thereof include reverse-roll coating, gravure coating, kiss coating, roll-brush coating, spray coating, air-knife coating, wire-bar coating, pipe doctor method, and the like. These methods can be used singly or in combination. The adhesion-facilitating layer can be provided by applying the coating solution to one side or both sides of an unstretched film or uniaxially stretched film in the film production process.

The polyester film of the present invention may be a uniaxially stretched film or a biaxially stretched film. However, care should be taken when a biaxially stretched film is used as the protective film, because no rainbow unevenness is observed when the film is viewed from right above the film plane, whereas rainbow unevenness may be observed when the film is viewed from an oblique direction.

This phenomenon is caused by the following factors: The biaxially stretched film has an index ellipsoid with different refractive indices in the running direction, width direction, and thickness direction, and there is a direction in which the retardation is zero (the index ellipsoid looks like a perfect circle) depending on the light transmission direction in the film. Accordingly, when the screen of the liquid crystal display is observed from a specific oblique direction, there may be a point at which the retardation is zero. Centering on that point, rainbow unevenness is generated in a concentric manner. When the angle between the position right above the film surface (normal direction) and the position at which rainbow unevenness is visible is regarded as θ, the angle θ becomes larger as the birefringence in the film plane increases, and rainbow unevenness is less likely to be visible. Since a biaxially stretched film tends to have a lower angle θ, a uniaxially stretched film, in which rainbow unevenness is less likely to be visible, is preferred.

However, a complete uniaxial (uniaxially symmetric) film is not preferred, because mechanical strength in a direction orthogonal to the orientation direction remarkably decreases. In the present invention, it is preferable to have biaxiality (biaxial symmetry) in a range where rainbow unevenness is not substantially generated, or in a range where rainbow unevenness is not generated within the range of the viewing angle required for liquid crystal display screens.

As an indicator for determining the difficulty in visibility of rainbow unevenness, there is a method of evaluating differences in retardation (in-plane retardation) and thickness-direction retardation (Rth). A thickness-direction phase difference indicates the average of phase differences obtained by multiplying each of two birefringence values ΔNxz and ΔNyz, when the film is viewed from the thickness-direction cross-section, by the film thickness d. The smaller the difference between the in-plane retardation and the thickness-direction retardation, the higher the isotropy of the action of birefringence depending on the observation angle. Thus, the variation of retardation depending on the observation angle is reduced. Accordingly, the occurrence of rainbow unevenness depending on the observation angle is presumably prevented.

The ratio of retardation to thickness-direction retardation (Re/Rth) of the polyester film of the present invention is preferably 0.2 or higher, more preferably 0.5 or higher, and still more preferably 0.6 or higher. The greater the ratio of retardation to thickness-direction retardation (Re/Rth), the higher the isotropy of the action of birefringence, and the more the occurrence of rainbow unevenness depending on the observation angle is prevented. A complete uniaxial (uniaxially symmetric) film has a ratio of retardation to thickness-direction retardation (Re/Rth) of 2.0. However, as described above, as the film becomes closer to a complete uniaxial (uniaxially symmetric) film, mechanical strength in a direction orthogonal to the orientation direction remarkably decreases.

On the other hand, the ratio of retardation to thickness-direction retardation (Re/Rth) of the polyester film of the present invention is preferably 1.2 or less, and more preferably 1.0 or less. In order to completely prevent the occurrence of rainbow unevenness depending on the observation angle, the above ratio of retardation to thickness-direction retardation (Re/Rth) is not necessarily 2.0, but is sufficiently 1.2 or less. Moreover, even if the above ratio is 1.0 or less, it is sufficiently possible to satisfy viewing-angle characteristics required for liquid crystal display devices (right/left viewing angle: about 180 degrees, and upper/lower viewing angle: about 120 degrees).

The film-forming conditions of the polyester film are described in detail below. The temperature for stretching in the longitudinal direction and the temperature for stretching in the transverse direction are preferably 80 to 130° C., and particularly preferably 90 to 120° C. The stretch ratio for stretching in the longitudinal direction is preferably 1.0 to 3.5, and particularly preferably 1.0 to 3.0. The stretch ratio for stretching in the transverse direction is preferably 2.5 to 6.0, and particularly preferably 3.0 to 5.5. In order to control the retardation within the above range, it is preferable to control the proportion of longitudinal stretch ratio and transverse stretch ratio. An overly small difference between the longitudinal and transverse stretch ratios is not preferred, because it is difficult to make a difference in retardation. To increase the retardation, it is also preferable to set the stretch temperature low. In the subsequent heat treatment, the treatment temperature is preferably 100° C. to 250° C., and particularly preferably 180° C. to 245° C.

In order to suppress variations in retardation, the thickness variation of the film is preferably low. Since the stretch temperature and the stretch ratios have a great influence on the film thickness variation, it is necessary to optimize the film production conditions in terms of the thickness variation. In particular, when the longitudinal stretch ratio is reduced to make a difference in retardation, the longitudinal thickness variation may deteriorate. Since there is an area, in which the longitudinal thickness variation significantly deteriorates in a specific range of the stretch ratio, it is preferable to set the film production conditions outside that range.

The film of the present invention preferably has a thickness variation of 5.0% or less, more preferably 4.5% or less, still more preferably 4.0% or less, and particularly preferably 3.0% or less. The thickness variation of the film can be measured, for example, as follows. A tape-like sample continuous in a longitudinal direction (length: 3 m) is taken from the film, and the thickness of the sample is measured in 100 points at a 1-cm pitch. The thickness can be measured by using, for example, an electronic micrometer (Miritoron 1240, produced by Seiko EM). The maximum value (dmax), minimum value (dmin), and average value (d) of thickness are determined from the measured values, and the thickness variation (%) can be calculated by the following formula:

Thickness variation (%)=(($d$max−$d$min)/$d$)×100

As described above, it is possible to control the retardation of the film in a specific range by appropriately setting the stretch ratio, the stretch temperature, and the thickness of the film. For example, the higher the stretch ratio, the lower the stretch temperature, or the greater the thickness of the film, the more likely will a large retardation be obtained. In contrast, the lower the stretch ratio, the higher the stretch temperature, or the smaller the thickness of the film, the more likely will a small retardation be obtained. However, when the film thickness is increased, the phase difference in the thickness direction is likely to increase. It is therefore preferable to appropriately set the film thickness in the range described later. In addition to the control of retardation, it is necessary to determine the final film production conditions in consideration of physical properties, etc., required for processing.

The polyester film used in the present invention may have any thickness, but preferably has a thickness in the range of 15 to 300 μm, and more preferably 15 to 200 μm. Even a film having a thickness of lower than 15 μm can, in principle, provide a retardation of 3,000 nm or higher. In this case, however, the mechanical properties of the film become significantly anisotropic. This causes the film to, for example, tear or break, which significantly reduces the practicality of the film as an industrial material. The lower limit of the thickness is particularly preferably 25 μm. On the other hand, when the upper limit of the thickness of the protective film exceeds 300 μm, the polarizer is overly thick, which is not preferred. The upper limit of the thickness is preferably 200 μm in terms of the practicality as a protective film. The upper limit of the thickness is particularly preferably 100 μm, which is almost equivalent to the thickness of a general TAC film. In order to control the retardation in the range of the present invention in the above thickness range, polyethylene terephthalate is preferred as the polyester used as the film base.

As the method for mixing an ultraviolet absorber with the polyester film of the present invention, known methods can be used in combination. For example, a masterbatch is previously produced by mixing a dried ultraviolet absorber with polymer starting materials using a kneading extruder, and the masterbatch and the polymer starting materials are mixed during the film production.

In that case, the ultraviolet absorber concentration in the masterbatch is preferably 5 to 30 mass % so as to uniformly disperse and economically mix the ultraviolet absorber.

Preferred conditions for producing the masterbatch include the use of a kneading extruder, and extrusion at a temperature equal to or greater than the melting point of the polyester starting material and equal to or lower than 290° C. for 1 to 15 minutes. At a temperature of 290° C. or more, a large amount of ultraviolet absorber is lost, and the viscosity of the masterbatch is significantly reduced. For an extrusion time of 1 minute or less, it is difficult to homogeneously mix the ultraviolet absorber. At this point, a stabilizer, a color tone-controlling agent, and an antistatic agent may be added, if necessary.

In the present invention, it is preferable that the film have a multi-layered structure including at least three or more layers, and that an ultraviolet absorber be added to the intermediate layer(s) of the film. Such a three-layer film containing an ultraviolet absorber in the intermediate layer can be specifically produced in the following manner. Polyester pellets are singly used for the outer layers. For the intermediate layer, polyester pellets and a masterbatch containing an ultraviolet absorber are mixed in a predetermined proportion, and then dried. These are supplied into a known extruder for melt-lamination, and extruded through a slit-shaped die into a sheet-like shape, followed by cooling and solidification on a casting roll, thereby forming an unstretched film. More specifically, film layers constituting both outer layers and a film layer constituting the intermediate layer are laminated by using two or more extruders, a three-layer manifold, or a junction block (e.g., a junction block having a square-shaped junction). A three-layered sheet is extruded through a die and cooled on a casting roll, thereby forming an unstretched film. In the invention, in order to remove foreign substances, which cause optical defects, from the starting material (i.e., polyester), it is preferable to perform high-precision filtration during melt extrusion. The filtration particle size (initial filtration efficiency: 95%) of a filtering medium used for high-precision filtration of the molten resin is preferably 15 μm or less. When the filtration particle size of the filtering medium is more than 15 μm, the removal of foreign substances having a size of 20 μm or more is likely to be insufficient.

EXAMPLES

The present invention will hereinafter be described more specifically by way of Examples; however, the present invention is not limited to the Examples described below. The present invention can be put into practice after appropriate modifications or variations within a range meeting the gist of the present invention, all of which are included in the technical scope of the present invention. In the following Examples, the methods for the evaluation of physical properties are as follows:

(1) Glass Transition Temperature

The glass transition temperature was measured according to JIS K7121 using a differential scanning calorimeter (DSC6200, produced by Seiko Instruments Inc.). The temperature of a resin sample (10 mg) was raised at a rate of 20° C./min in a temperature range of 25 to 300° C., and an extrapolated glass transition initiation temperature obtained from the DSC curve was defined as the glass transition temperature.

(2) Number Average Molecular Weight

A resin (0.03 g) was dissolved in 10 ml of tetrahydrofuran, and the number average molecular weight was measured by using a GPC-LALLS (low angle laser light scattering) photometer LS-8000 (produced by Tosoh Corporation; tetrahydrofuran solvent; reference: polystyrene) and columns (Shodex KF-802, 804, and 806, produced by Showa Denko K.K.) at a column temperature of 30° C. at a flow rate of 1 ml/min.

(3) Resin Composition

A resin was dissolved in heavy chloroform, and $^1$H-NMR analysis was performed using a nuclear magnetic resonance (NMR) spectrometer (Gemini 200, produced by Varian) to determine the molar percent ratio of each composition by the integration ratio.

(4) Acid Value

A sample (solids content: 1 g) was dissolved in 30 ml of chloroform or dimethylformamide, and titrated with a 0.1 N potassium hydroxide/ethanol solution using phenolphthalein as an indicator to determine the amount (mg) of KOH required to neutralize carboxyl groups per gram of the sample.

(5) Degree of Saponification

The amount of residual acetate groups (mol %) of polyvinyl alcohol resin was quantified using sodium hydroxide according to JIS-K6726, and the obtained value was defined as the degree of saponification (mol %). The measurement was repeated three times on the same sample, and the average of the obtained values was used as the degree of saponification (mol %).

(6) Retardation (Re)

Retardation is a parameter defined by the product ($\Delta Nxy \times d$) of the anisotropy ($\Delta Nxy = |Nx - Ny|$) of refractive indices in two mutually orthogonal directions on a film and the film thickness d (nm), and is a scale indicating optical isotropy or anisotropy. The anisotropy ($\Delta Nxy$) of refractive indices in two directions is obtained by the following method. The directions of orientation axes of a film were determined using two polarizers, and the film was cut into a 4 cm×2 cm rectangle so that the direction of the orientation axis was orthogonal to either side of the rectangle. The cut piece was used as a sample for measurement. The sample was measured for the refractive indices (Nx and Ny) in two mutually orthogonal directions and the refractive index (Nz) in the thickness direction by the use of an Abbe refractometer (NAR-4T available from Atago Co., Ltd.). Then, the absolute value ($|Nx - Ny|$) of the difference between the refractive indices in two directions was defined as the anisotropy ($\Delta Nxy$) of the refractive indices. The film thickness d (nm) was measured using an electric micrometer (Millitron 1245D, available from Feinpruf GmbH), and was converted to nm units. The retardation (Re) was determined by the product ($\Delta Nxy \times d$) of the anisotropy ($\Delta Nxy$) of the refractive indices and the film thickness d (nm).

(7) Thickness-Direction Retardation (Rth)

Thickness-direction retardation is a parameter indicating the average of retardation obtained by multiplying two birefringence values $\Delta Nxz$ ($= |Nx - Nz|$) and $\Delta Nyz$ ($= |Ny - Nz|$) when viewed from a film-thickness direction cross-section, by a film thickness d. The refractive indices Nx, Ny, and Nz, and the film thickness d (nm) were determined in the same manner as in the measurement of retardation, and the average value of ($\Delta Nxz \times d$) and ($\Delta Nyz \times d$) was calculated to determine the thickness-direction retardation (Rth).

(8) Light Transmittance at Wavelength of 380 nm

Using a spectrophotometer (U-3500, produced by Hitachi, Ltd.), the light transmittance of each film at a wavelength of 300 to 500 nm was measured using the air space as standard, and the light transmittance at a wavelength of 380 nm was determined.

(9) Observation of Rainbow Unevenness

The polyester film of the present invention was bonded to one side of a polarizing film comprising PVA and iodine so that the absorption axis of the polarizing film was vertical to the main orientation axis of the polyester film. A TAC film (produced by Fujifilm Corporation; thickness: 80 μm) was bonded to the opposite side, thereby producing a polarizer. The obtained polarizer was placed on the light-outgoing side of a liquid crystal display device (having a polarizer comprising two TAC films as protective films on the light source side of the liquid crystal cell) that employed, as a light source, white LEDs (NSPW500CS, available from Nichia Corporation) having light-emitting devices obtained by the combined use of yttrium-aluminum-garnet yellow phosphors with blue light-emitting diodes, so that the polyester film was disposed on the light-outgoing side. The polarizer of the liquid crystal display device was visually observed from the front direction and an oblique direction, and the occurrence of rainbow unevenness was determined as follows. In Comparative Example 5, a backlight light source using cold-cathode tubes as the light source was used in place of the white LEDs.

++: no formation of rainbow unevenness observed from any direction

+: partial, very light rainbow unevenness observed from an oblique direction

−: clear rainbow unevenness observed from an oblique direction

(10) Tear Strength

The tear strength of each film was measured according to JIS P-8116 using an Elmendorf tearing tester (produced by Toyo Seiki Seisaku-sho, Ltd.). The tear direction was parallel to the orientation axis direction of the film, and the results were evaluated as follows. The orientation axis direction was measured by a molecular orientation analyzer (MOA-6004, produced by Oji Scientific Instruments).

+: Tear strength was 50 mN or more.

−: Tear strength was less than 50 mN.

(11) PVA Adhesion

A polyvinyl alcohol aqueous solution (PVA117, produced by Kuraray Co., Ltd.) adjusted to a solids content of 5 mass % was applied to the surface of the adhesion-facilitating layer of the protective film using a wire bar so that the thickness of the dried polyvinyl alcohol resin layer was 2 μm, and dried at 70° C. for 5 minutes. In order to facilitate determination, red dye was added to the polyvinyl alcohol aqueous solution. The produced film, which was the subject of evaluation, was attached to a 5-mm-thick glass plate, to which a double-sided tape had been attached, so that the surface of the film opposite to the surface coated with the polyvinyl alcohol resin layer was in contact with the double-sided tape. Then, 100 grid cuts penetrating the polyvinyl alcohol resin layer to reach the protective film were made using a cutter guide with space intervals of 2 mm. Subsequently, an adhesive tape (Cellotape (registered trademark) CT-24, produced by Nichiban Co., Ltd.; 24 mm width) was bonded to the grid cut surface. Air remaining in the interface during the bonding was pushed out using an eraser to completely bond to each other, and then the adhesive tape was swiftly peeled off vertically. This operation was conducted once, five times, and ten times. The number of grids in which the polyvinyl alcohol resin layer was not peeled was counted, and used as the PVA adhesion. More specifically, when the PVA layer was not peeled at all, the PVA adhesion rate was 100; whereas when the entire PVA layer was peeled, the PVA adhesion rate was 0. Accordingly, for example, when peeling is observed in five grids, the PVA adhesion rate is 95. Grids in which partial peeling occurred were also counted as having peeled.

Production of Adhesion-Facilitating Layer Components
Polymerization of Polyester Resin Dimethyl terephthalate (194.2 parts by mass), 184.5 parts by mass of dimethyl isophthalate, 14.8 parts by mass of dimethyl-5-sodium sulfoisophthalate, 233.5 parts by mass of diethylene glycol, 136.6 parts by mass of ethylene glycol, and 0.2 parts by mass of tetra-n-butyl titanate were placed in a stainless steel autoclave equipped with a stirrer, a thermometer, and a partial reflux condenser, and transesterification was performed at a temperature of 160 to 220° C. for 4 hours. Subsequently, the temperature was raised to 255° C., and the pressure of the reaction system was gradually reduced. The reaction was then performed at a reduced pressure of 30 Pa for an hour and a half, thereby obtaining a copolymerized polyester resin (A-1). The obtained copolymerized polyester resin (A-1) was light yellow and transparent. The reduced viscosity of the copolymerized polyester resin (A-1) was 0.70 dl/g. The glass transition temperature measured by DSC was 40° C.

Copolymerized polyester resins (A-2) and (A-3) having different compositions were obtained in the same manner as described above. Table 1 shows the compositions (mol % ratio; measured by $^1$H NMR) and other properties of these copolymerized polyester resins.

TABLE 1

|  |  | A-1 | A-2 | A-3 |
|---|---|---|---|---|
| Dicarboxylic acid component (mol %) | Terephthalic acid | 49 | 49 | 97 |
|  | Isophthalic acid | 48 | 48 | — |
|  | Trimellitic acid | — | — | — |
|  | 5-sodium sulfoisophthalate | 3 | 3 | 3 |
| Glycol component (mol %) | Ethylene glycol | 40 | 50 | 20 |
|  | Diethylene glycol | 60 | — | — |
|  | Neopentyl glycol | — | 50 | — |
|  | Propanediol | — | — | 79 |
|  | Trimethylolpropane | — | — | 1 |
| Physical properties | Glass transition temperature (° C.) | 40 | 65 | 75 |
|  | Number average molecular weight (×1,000 MW) | 20 | 15 | 8 |
|  | Acid value (KOHmg/g) | 2 | 4 | 6 |

Preparation of Polyester Aqueous Dispersion

The polyester resin (A-1) (30 parts by mass) and 15 parts by mass of ethylene glycol n-butyl ether were placed in a reactor equipped with a stirrer, a thermometer, and a reflux condenser, and the mixture was heated to 110° C. and stirred to dissolve the resin. After the resin was completely dissolved, 55 parts by mass of water was gradually added to the polyester solution while stirring. After addition, the solution was cooled to room temperature while stirring, thereby preparing a milky-white polyester aqueous dispersion (Aw-1) having a solids content of 30 mass %. Aqueous dispersions (Aw-2) and (Aw-3) were prepared in the same manner as described above using the polyester resins (A-2) and (A-3) in place of the polyester resin (A-1).

Preparation of Polyvinyl Alcohol Aqueous Solution

Water (90 parts by mass) was placed in a container equipped with a stirrer and a thermometer, and, while stirring, 10 parts by mass of polyvinyl alcohol resin having a degree of polymerization of 500 (produced by Kuraray) (B-1) was gradually added. After addition, the solution was heated to 95° C., while stirring, to dissolve the resin. After dissolution, the solution was cooled to room temperature while stirring, thereby preparing a polyvinyl alcohol aqueous solution (Bw-1) having a solids content of 10 mass %. Aqueous solutions (Bw-2) to (Bw-6) were prepared in the same manner as described above using polyvinyl alcohol resins (B-2) to (B-6) in place of the polyvinyl alcohol resin (B-1). Table 2 shows the degree of saponification of the polyvinyl alcohol resins (B-1) to (B-6).

TABLE 2

|  | B-1 | B-2 | B-3 | B-4 | B-5 | B-6 |
|---|---|---|---|---|---|---|
| Saponification degree (mol %) | 88 | 83 | 79 | 74 | 70 | 67 |

Polymerization of Blocked Polyisocyanate Crosslinking Agent

A polyisocyanate compound comprising hexamethylene diisocyanate as a starting material and having an isocyanurate structure (100 parts by mass; Duranate TPA, produced by Asahi Kasei Chemicals Corp.), 55 parts by mass of propylene glycol monomethyl ether acetate, and 30 parts by mass of polyethylene glycol monomethyl ether (average molecular weight: 750) were placed in a flask equipped with a stirrer, a thermometer, and a reflux condenser tube, and maintained in a nitrogen atmosphere at 70° C. for 4 hours. Thereafter, the temperature of the reaction mixture was reduced to 50° C., and 47 parts by mass of methylethylketoxime was added dropwise. The infrared spectrum of the reaction mixture was measured, and it was confirmed that no absorption of isocyanate group was observed. Thus, a blocked polyisocyanate aqueous dispersion (C-1) having a solids content of 75 mass % was obtained.

Production of Protective Film Components

Polyester X

The temperature of an esterification reaction vessel was raised, and when the temperature reached 200° C., 86.4 parts by mass of terephthalic acid and 64.6 parts by mass of ethylene glycol were put in the vessel. While stirring the mixture, 0.017 parts by mass of antimony trioxide, 0.064 parts by mass of magnesium acetate tetrahydrate, and 0.16 parts by mass of triethylamine were added as catalysts. Subsequently, the pressure and temperature were raised, and pressure esterification was performed at a gauge pressure of 0.34 MPa at 240° C. Then, the pressure in the esterification reaction vessel was returned to normal pressure, and 0.014 parts by mass of phosphoric acid was added. Further, the temperature was raised to 260° C. over 15 minutes, and 0.012 parts by mass of trimethyl phosphate was added. Subsequently, after 15 minutes, dispersion was performed with a high-pressure disperser. After 15 minutes, the obtained esterification reaction product was transferred to a polycondensation reaction vessel, and a polycondensation reaction was performed at 280° C. under reduced pressure. After completion of the polycondensation reaction, filtration was performed using a Naslon filter (95% cut size: 5 μm). The resultant was extruded through a nozzle into a strand shape, cooled and solidified with cooling water, which had been previously filtered (pore size: 1 μm or less), and cut into pellets. The obtained polyethylene terephthalate resin had an intrinsic viscosity of 0.62 dl/g, and did not substantially contain inert particles and internally deposited particles (hereafter abbreviated as "PET (X)").

Polyester Y

A dried ultraviolet absorber 2,2'-(1,4-phenylene)bis(4H-3,1-benzoxazin-4-one) (10 parts by mass) and 90 parts by mass of particle-free PET (X) (intrinsic viscosity: 0.62 dl/g) were mixed, and a kneading extruder was used to obtain a polyethylene terephthalate resin (Y) containing the ultraviolet absorber (hereafter abbreviated as "PET (Y)").

Example 1

The following coating components were mixed to prepare a coating solution in which the mass ratio of the polyester resin (A) to the polyvinyl alcohol resin (B) was 70/30. The polyester aqueous dispersion used was the aqueous dispersion (Aw-1) of polyester resin having an acid value of 2 KOHmg/g. The polyvinyl alcohol aqueous solution used was the aqueous solution (Bw-4) of polyvinyl alcohol having a degree of saponification of 74 mol %.

Water: 40.61 mass %
Isopropanol: 30.00 mass %
Polyester aqueous dispersion (Aw-1): 11.67 mass %
Polyvinyl alcohol aqueous solution (Bw-4): 15.00 mass %
Blocked isocyanate crosslinking agent (C-1): 0.67 mass %
Particles (silica sol with an average particle diameter of 100 nm; solids content: 40 mass %): 1.25 mass %
Catalyst (organic tin compound; solids content: 14 mass %): 0.3 mass %
Surfactant (silicon-based; solids content: 10 mass %): 0.5 mass %

As the starting materials for the protective film intermediate layer, 90 parts by mass of particle-free PET (X) resin pellets and 10 parts by mass of ultraviolet absorber-containing PET (Y) resin pellets were vacuum-dried (1 Torr) at 135° C. for 6 hours, and then supplied to an extruder 2 (for the intermediate layer II). Further, PET (X) was dried by a standard method, supplied to extruders 1 (each for the outer layer I and the outer layer III), and melted at 285° C. These two polymers were each filtered through a filtering medium of a stainless steel sintered body (nominal filtering accuracy: 10 μm-particle 95% cut), laminated by two types of three-layered junction blocks, and extruded through a die into a sheet-like shape. The resulting sheet was cooled and solidified by winding the sheet around a casting drum having a surface temperature of 30° C. by an electrostatic casting method, thereby forming an unstretched film. At this time, the discharge of each extruder was adjusted so that the thickness ratio of layer I, layer II, and layer III was 10:80:10.

Then, the above-prepared coating solution was applied to both sides of the unstretched PET film by reverse-roll coating so that the amount of dried coating was 0.12 g/m², followed by drying at 80° C. for 20 seconds.

The unstretched film, on which a coating layer had been formed, was guided to a tenter stretching machine. While holding the edges of the film with clips, the film was guided to a hot-air zone with a temperature of 125° C., and stretched 4.0 times in the width direction. Subsequently, while maintaining the width of the film stretched in the width direction, the film was treated at a temperature of 225° C. for 30 seconds, and further subjected to 3% relaxation treatment in the width direction. Thus, a uniaxially oriented PET film having a thickness of about 50 μm was obtained.

Example 2

A uniaxially oriented PET film having a thickness of about 100 μm was obtained in the same manner as in Example 1, except that the coating solution was applied to one side of the unstretched PET film, and that the thickness of the unstretched film was changed.

Example 3

A biaxially oriented PET film having a thickness of about 50 μm was obtained in the same manner as in Example 1, except that the unstretched film was heated to 105° C. using heated rolls and an infrared heater, and that the film was then stretched 1.5 times in the running direction by rolls having different peripheral speeds, and then stretched 4.0 times in the width direction.

Example 4

A biaxially oriented PET film having a thickness of about 50 μm was obtained in the same manner as in Example 3, except that the unstretched film was stretched 2.0 times in the running direction and 4.0 times in the width direction.

Example 5

A biaxially oriented PET film having a thickness of about 75 μm was obtained in the same manner as in Example 3, except that the unstretched film was stretched 3.3 times in the running direction and 4.0 times in the width direction.

Example 6

A uniaxially oriented PET film having a thickness of about 50 μm was obtained in the same manner as in Example 1, except that the ultraviolet absorber-containing PET resin (Y) was not used in the intermediate layer. The obtained film did not have rainbow unevenness, but had high light transmittance at 380 nm, which may degrade the optical functional dye.

Example 7

A uniaxially oriented PET film having a thickness of about 100 μm was obtained in the same manner as in Example 3, except that the unstretched film was stretched 4.0 times in the running direction and 1.0 times in the width direction. The obtained film had a retardation of 3,000 nm or more. Although the visibility was excellent, the mechanical strength was slightly inferior.

Example 8

A biaxially oriented PET film having a thickness of about 250 μm was obtained in the same manner as in Example 3, except that the unstretched film was stretched 3.5 times in the running direction and 3.7 times in the width direction. The obtained film had a retardation of 4,500 nm or more; however, the Re/Rth ratio was less than 0.2, and thus, very slight rainbow unevenness was observed when the film was viewed from an oblique direction.

Example 9

A uniaxially oriented PET film having a thickness of about 75 μm was obtained in the same manner as in Example 1, except that the unstretched film was stretched 1.0 times in the running direction and 3.5 times in the width direction.

Example 10

A uniaxially oriented PET film having a thickness of about 275 μm was obtained in the same manner as in Example 1, except that the thickness of the unstretched film was changed.

Example 11

A uniaxially oriented PET film was obtained in the same manner as in Example 1, except that the polyester aqueous dispersion was changed to the aqueous dispersion (Aw-2) of polyester resin having an acid value of 4 KOHmg/g.

Example 12

A uniaxially oriented PET film was obtained in the same manner as in Example 1, except that the polyester aqueous dispersion was changed to the aqueous dispersion (Aw-3) of polyester resin having an acid value of 6 KOHmg/g.

Example 13

A uniaxially oriented PET film was obtained in the same manner as in Example 1, except that the polyvinyl alcohol aqueous solution was changed to the aqueous solution (Bw-3) of polyvinyl alcohol having a degree of saponification of 79 mol %.

Example 14

A uniaxially oriented PET film was obtained in the same manner as in Example 1, except that the polyvinyl alcohol aqueous solution was changed to the aqueous solution (Bw-2) of polyvinyl alcohol having a degree of saponification of 83 mol %.

Example 15

A uniaxially oriented PET film was obtained in the same manner as in Example 1, except that the following coating components were mixed, and that the mass ratio of the polyester resin (A) to the polyvinyl alcohol resin (B) was changed to 60/40.
Water: 37.28 mass %
Isopropanol: 30.00 mass %
Polyester aqueous dispersion (Aw-1): 10.00 mass %
Polyvinyl alcohol aqueous solution (Bw-4): 20.00 mass %
Blocked isocyanate crosslinking agent (C-1): 0.67 mass %
Particles (silica sol with an average particle diameter of 100 nm; solids content: 40 mass %): 1.25 mass %
Catalyst (organic tin compound: solids content: 14 mass %): 0.3 mass %
Surfactant (silicon-based; solids content: 10 mass %): 0.5 mass %

Example 16

A uniaxially oriented PET film was obtained in the same manner as in Example 1, except that the following coating components were mixed, and that the mass ratio of the polyester resin (A) to the polyvinyl alcohol resin (B) was changed to 80/20.
Water: 43.95 mass %
Isopropanol: 30.00 mass %
Polyester aqueous dispersion (Aw-1): 13.33 mass %
Polyvinyl alcohol aqueous solution (Bw-4): 10.00 mass %
Blocked isocyanate crosslinking agent (C-1): 0.67 mass %
Particles (silica sol with an average particle diameter of 100 nm; solids content: 40 mass %): 1.25 mass %
Catalyst (organic tin compound; solids content: 14 mass %): 0.3 mass %
Surfactant (silicon-based; solids content: 10 mass %): 0.5 mass %

Example 17

A uniaxially oriented PET film was obtained in the same manner as in Example 1, except that the following coating components were mixed, and that the mass ratio of the polyester resin (A) to the polyvinyl alcohol resin (B) was changed to 50/50.
Water: 33.95 mass %
Isopropanol: 30.00 mass %
Polyester aqueous dispersion (Aw-1): 8.33 mass %
Polyvinyl alcohol aqueous solution (Bw-4): 25.00 mass %
Blocked isocyanate crosslinking agent (C-1): 0.67 mass %
Particles (silica sol with an average particle diameter of 100 nm; solids content: 40 mass %): 1.25 mass %
Catalyst (organic tin compound; solids content: 14 mass %): 0.3 mass %
Surfactant (silicon-based; solids content: 10 mass %): 0.5 mass %

Example 18

A uniaxially oriented PET film was obtained in the same manner as in Example 1, except that the formulation of the coating solution was changed as follows.
Water: 40.87 mass %
Isopropanol: 30.00 mass %
Polyester aqueous dispersion (Aw-1): 11.67 mass %
Polyvinyl alcohol aqueous solution (Bw-4): 15.00 mass %
Melamine crosslinking agent (C-2) (Nikalac MX-042, produced by Sanwa Chemical Co., Ltd.; solids content: 70%); 0.71 mass %
Particles (silica sol with an average particle diameter of 100 nm; solids content: 40 mass %): 1.25 mass %
Surfactant (silicon-based; solids content: 10 mass %): 0.5 mass %

Example 19

A uniaxially oriented PET film was obtained in the same manner as in Example 1, except that the polyvinyl alcohol aqueous solution was changed to the aqueous solution (Bw-5) of polyvinyl alcohol having a degree of saponification of 70 mol %.

Example 20

A uniaxially oriented PET film was obtained in the same manner as in Example 1, except that the polyvinyl alcohol aqueous solution was changed to the aqueous solution (Bw-6) of polyvinyl alcohol having a degree of saponification of 67 mol %.

Example 21

A uniaxially oriented PET film was obtained in the same manner as in Example 1, except that the formulation of the coating solution was changed as follows.
Water: 40.33 mass %
Isopropanol: 30.00 mass %
Polyester aqueous dispersion (Aw-1): 11.67 mass %
Polyvinyl alcohol aqueous solution (Bw-2): 15.00 mass %
Oxazoline crosslinking agent (C-3) (Epocros WS-500, produced by Nippon Shokubai Co., Ltd.; solids content: 40 mass %): 1.25 mass %
Particles (silica sol with an average particle diameter of 100 nm; solids content: 40 mass %): 1.25 mass %
Surfactant (silicon-based; solids content: 10 mass %): 0.5 mass %

Example 22

A uniaxially oriented PET film was obtained in the same manner as in Example 1, except that the polyvinyl alcohol aqueous solution was changed to the aqueous solution (Bw-1) of polyvinyl alcohol having a degree of saponification of 88 mol %.

Example 23

A uniaxially oriented PET film was obtained in the same manner as in Example 1, except that the following coating components were mixed without mixing a crosslinking agent.
Water: 41.58 mass %
Isopropanol: 30.00 mass %
Polyester aqueous dispersion (Aw-1): 11.67 mass %
Polyvinyl alcohol aqueous solution (Bw-4): 15.00 mass %
Particles (silica sol with an average particle diameter of 100 nm; solids content: 40 mass %): 1.25 mass %
Surfactant (silicon-based; solids content: 10 mass %): 0.5 mass %

Example 24

An antiglare layer was provided on the surface of the uniaxially oriented polyester film of Example 2 opposite to the surface having a coating layer. Similar to Example 2, no rainbow unevenness was observed from any direction; thus, an excellent result was obtained.

Comparative Example 1

A biaxially oriented PET film having a thickness of about 38 pin was obtained in the same manner as in Example 3, except that the unstretched film was stretched 3.6 times in the running direction and 4.0 times in the width direction. The obtained film had a low retardation, and rainbow unevenness was observed when the film was viewed from an oblique direction.

Comparative Example 2

A uniaxially oriented PET film having a thickness of about 10 μm was obtained in the same manner as in Example 1, except that the thickness of the unstretched film was changed. The obtained film was very easy to tear and had no body. Therefore, this film could not be used as the protective film. Moreover, retardation was low, and rainbow unevenness was observed.

Comparative Example 3

A uniaxially oriented PET film was obtained in the same manner as in Example 1, except that the following coating components were mixed, and that the mass ratio of the polyester resin (A) to the polyvinyl alcohol resin (B) was changed to 100/0.
Water: 50.62 mass %
Isopropanol: 30.00 mass %
Polyester aqueous dispersion (Aw-1): 16.66 mass %
Blocked isocyanate crosslinking agent (C-1): 0.67 mass %
Particles (silica sol with an average particle diameter of 100 nm; solids content: 40 mass %): 1.25 mass %
Catalyst (organic tin compound; solids content: 14 mass %): 0.3 mass %
Surfactant (silicon-based; solids content: 10 mass %): 0.5 mass %

Comparative Example 4

A uniaxially oriented PET film was obtained in the same manner as in Example 1, except that the following coating components were mixed, and that the mass ratio of the polyester resin (A) to the polyvinyl alcohol resin (B) was changed to 0/100.

Water: 17.28 mass %
Isopropanol: 30.00 mass %
Polyvinyl alcohol aqueous solution (Bw-4): 50.00 mass %
Blocked isocyanate crosslinking agent (C-1): 0.67 mass %
Particles (silica sol with an average particle diameter of 100 nm; solids content: 40 mass %): 1.25 mass %
Catalyst (organic tin compound; solids content: 14 mass %): 0.3 mass %
Surfactant (silicon-based; solids content: 10 mass %): 0.5 mass %

Comparative Example 5

The same procedure as in Example 1 was carried out, except that cold-cathode tubes were used as the light source of the liquid crystal display device.

TABLE 3

| | Thickness (μm) | Running-direction stretch ratio | Width-direction stretch ratio | Nx | Ny | Nz | Re (nm) | Rth (nm) | Re/Rth ratio | Observation of rainbow unevenness | Tear strength | 380-nm light transmittance (%) | Polyester resin (A) Type | Polyester resin (A) Add value (KOHmg/g) | Polyvinyl alcohol resin (B) Type | Polyvinyl alcohol resin (B) Saponification degree (mol %) | A/B | Cross-linking agent | PVA adhesion 1 peeling | PVA adhesion 5 peeling | PVA adhesion 10 peeling |
|---|---|---|---|---|---|---|---|---|---|---|---|---|---|---|---|---|---|---|---|---|---|
| Ex. 1 | 50 | 1.0 | 4.0 | 1.593 | 1.697 | 1.513 | 5177 | 6602 | 0.784 | ++ | + | 8.5 | A-1 | 2 | B-4 | 74 | 70/30 | C-1 | 100 | 100 | 100 |
| Ex. 2 | 100 | 1.0 | 4.0 | 1.594 | 1.696 | 1.513 | 10200 | 13233 | 0.771 | ++ | + | 1.0 | A-1 | 2 | B-4 | 74 | 70/30 | C-1 | 100 | 100 | 100 |
| Ex. 3 | 50 | 1.5 | 4.0 | 1.608 | 1.686 | 1.508 | 3915 | 6965 | 0.562 | + | + | 8.5 | A-1 | 2 | B-4 | 74 | 70/30 | C-1 | 100 | 100 | 100 |
| Ex. 4 | 50 | 2.0 | 4.0 | 1.617 | 1.681 | 1.502 | 3215 | 7341 | 0.438 | + | + | 8.5 | A-1 | 2 | B-4 | 74 | 70/30 | C-1 | 100 | 100 | 100 |
| Ex. 5 | 75 | 3.3 | 4.0 | 1.640 | 1.688 | 1.498 | 3570 | 12480 | 0.286 | + | + | 2.5 | A-1 | 2 | B-4 | 74 | 70/30 | C-1 | 100 | 100 | 100 |
| Ex. 6 | 50 | 1.0 | 4.0 | 1.593 | 1.697 | 1.513 | 5177 | 6602 | 0.784 | ++ | − | 79.0 | A-1 | 2 | B-4 | 74 | 70/30 | C-1 | 100 | 100 | 100 |
| Ex. 7 | 100 | 4.0 | 1.0 | 1.735 | 1.570 | 1.520 | 16500 | 13250 | 1.245 | ++ | + | 1.0 | A-1 | 2 | B-4 | 74 | 70/30 | C-1 | 100 | 100 | 100 |
| Ex. 8 | 250 | 3.5 | 3.7 | 1.660 | 1.687 | 1.522 | 6750 | 37875 | 0.178 | ++ | + | 0.4 | A-1 | 2 | B-4 | 74 | 70/30 | C-1 | 100 | 100 | 100 |
| Ex. 9 | 75 | 1.0 | 3.5 | 1.580 | 1.678 | 1.525 | 7350 | 7800 | 0.942 | ++ | + | 2.5 | A-1 | 2 | B-4 | 74 | 70/30 | C-1 | 100 | 100 | 100 |
| Ex. 10 | 275 | 1.0 | 4.0 | 1.593 | 1.697 | 1.513 | 28476 | 36314 | 0.784 | ++ | + | 0.3 | A-1 | 2 | B-4 | 74 | 70/30 | C-1 | 100 | 100 | 97 |
| Ex. 11 | 50 | 1.0 | 4.0 | 1.593 | 1.697 | 1.513 | 5177 | 6602 | 0.784 | ++ | + | 8.5 | A-2 | 4 | B-4 | 74 | 70/30 | C-1 | 100 | 100 | 98 |
| Ex. 12 | 50 | 1.0 | 4.0 | 1.593 | 1.697 | 1.513 | 5177 | 6602 | 0.784 | ++ | + | 8.5 | A-3 | 6 | B-4 | 74 | 70/30 | C-1 | 100 | 100 | 99 |
| Ex. 13 | 50 | 1.0 | 4.0 | 1.593 | 1.697 | 1.513 | 5177 | 6602 | 0.784 | ++ | + | 8.5 | A-1 | 2 | B-3 | 79 | 70/30 | C-1 | 100 | 98 | 91 |
| Ex. 14 | 50 | 1.0 | 4.0 | 1.593 | 1.697 | 1.513 | 5177 | 6602 | 0.784 | ++ | + | 8.5 | A-1 | 2 | B-2 | 83 | 70/30 | C-1 | 100 | 100 | 96 |
| Ex. 15 | 50 | 1.0 | 4.0 | 1.593 | 1.697 | 1.513 | 5177 | 6602 | 0.784 | ++ | + | 8.5 | A-1 | 2 | B-4 | 74 | 60/40 | C-1 | 100 | 100 | 100 |
| Ex. 16 | 50 | 1.0 | 4.0 | 1.593 | 1.697 | 1.513 | 5177 | 6602 | 0.784 | ++ | + | 8.5 | A-1 | 2 | B-4 | 74 | 80/20 | C-1 | 100 | 100 | 94 |
| Ex. 17 | 50 | 1.0 | 4.0 | 1.593 | 1.697 | 1.513 | 5177 | 6602 | 0.784 | ++ | + | 8.5 | A-1 | 2 | B-4 | 74 | 50/50 | C-1 | 100 | 99 | 93 |
| Ex. 18 | 50 | 1.0 | 4.0 | 1.593 | 1.697 | 1.513 | 5177 | 6602 | 0.784 | ++ | + | 8.5 | A-1 | 2 | B-3 | 79 | 70/30 | C-2 | 100 | 100 | 99 |
| Ex. 19 | 50 | 1.0 | 4.0 | 1.593 | 1.697 | 1.513 | 5177 | 6602 | 0.784 | ++ | + | 8.5 | A-1 | 2 | B-5 | 70 | 70/30 | C-1 | 100 | 100 | 99 |
| Ex. 20 | 50 | 1.0 | 4.0 | 1.593 | 1.697 | 1.513 | 5177 | 6602 | 0.784 | ++ | + | 8.5 | A-1 | 2 | B-6 | 67 | 70/30 | C-1 | 100 | 100 | 98 |
| Ex. 21 | 50 | 1.0 | 4.0 | 1.593 | 1.697 | 1.513 | 5177 | 6602 | 0.784 | ++ | + | 8.5 | A-1 | 2 | B-2 | 83 | 70/30 | C-3 | 93 | 84 | 53 |
| Ex. 22 | 50 | 1.0 | 4.0 | 1.593 | 1.697 | 1.513 | 5177 | 6602 | 0.784 | ++ | + | 8.5 | A-1 | 2 | B-1 | 88 | 70/30 | C-1 | 89 | 69 | 41 |
| Ex. 23 | 50 | 1.0 | 4.0 | 1.593 | 1.697 | 1.513 | 5177 | 6602 | 0.784 | ++ | + | 8.5 | A-1 | 2 | B-4 | 74 | 70/30 | — | 87 | 22 | 4 |
| Ex. 24 | 100 | 1.0 | 4.0 | 1.594 | 1.696 | 1.513 | 10200 | 13233 | 0.771 | ++ | + | 1.0 | A-1 | 2 | B-4 | 74 | 70/30 | C-1 | 100 | 100 | 100 |
| Comp. Ex. 1 | 38 | 3.6 | 4.0 | 1.649 | 1.680 | 1.497 | 1178 | 6365 | 0.185 | − | + | 15.0 | A-1 | 2 | B-4 | 74 | 70/30 | C-1 | 100 | 100 | 100 |
| Comp. Ex. 2 | 10 | 1.0 | 4.0 | 1.591 | 1.698 | 1.513 | 1070 | 1318 | 0.812 | − | − | 56.0 | A-1 | 2 | B-4 | 74 | 70/30 | C-1 | 100 | 100 | 100 |
| Comp. Ex. 3 | 50 | 1.0 | 4.0 | 1.593 | 1.697 | 1.513 | 5177 | 6602 | 0.784 | ++ | + | 8.5 | A-1 | 2 | — | — | 100/0 | C-1 | 0 | 0 | 0 |
| Comp. Ex. 4 | 50 | 1.0 | 4.0 | 1.593 | 1.697 | 1.513 | 5177 | 6602 | 0.784 | ++ | + | 8.5 | — | — | B-4 | 74 | 0/100 | C-1 | 0 | 0 | 0 |
| Comp. Ex. 5 | 50 | 1.0 | 4.0 | 1.593 | 1.697 | 1.513 | 5177 | 6602 | 0.784 | − | + | 8.5 | A-1 | 2 | B-4 | 74 | 70/30 | C-1 | 100 | 100 | 100 |

INDUSTRIAL APPLICABILITY

The liquid crystal display device, polarizer, and protective film of the present invention are very highly industrially applicable, because the use of them results in an excellent adhesion and contributes to thinner LCDs and lower cost, without reduction in visibility caused by rainbow unevenness.

The invention claimed is:

1. A liquid crystal display device comprising a backlight source, a first polarizer, a liquid crystal cell, and a second polarizer, wherein
the liquid crystal cell has a light-outgoing side and a light-incoming side;
the first polarizer is disposed on the light-outgoing side of the liquid crystal cell;
the second polarizer is disposed on the light-incoming side of the liquid crystal cell;
the first polarizer comprises (a) a first polarizing film, (b) a protective film laminated on the light-outgoing side of the first polarizing film that is an oriented film having an in-plane retardation of 7,350 to 30,000 nm, a ratio of in-plane retardation to thickness-direction retardation (Re/Rth) of 0.2 or more and 2.0 or less, and a first adhesion-facilitating layer, and (c) a protective film laminated on the light-incoming side of the first polarizing film that is a birefringence-free film;
the second polarizer comprises (a) a second polarizing film, (b) a protective film laminated on the light-incoming side of the second polarizing film that is an oriented film having an in-plane retardation of 7,350 to 30,000 nm, a ratio of in-plane retardation to thickness-direction retardation (Re/Rth) of 0.2 or more and 2.0 or less, and a first adhesion-facilitating layer, and (c) a protective film laminated on the light-outgoing side of the second polarizing film that is a birefringence-free film; and
the first adhesion-facilitating layer in each of the first and second polarizers comprises a resin composition comprising a polyester resin (A) and a polyvinyl alcohol resin (B).

2. The liquid crystal display device according to claim 1, wherein the oriented film in each of the first and second polarizers has a ratio of in-plane retardation to thickness-direction retardation (Re/Rth) of 0.2 or more and 1.2 or less.

3. The liquid crystal display device according to claim 2, wherein the oriented film in the first polarizer has, on the opposite side of the surface facing the first polarizing film, one or more layers selected from the group consisting of a hard-coat layer, an antiglare layer, an antireflection layer, a low-reflection layer, a low-reflection antiglare layer, and an antireflection antiglare layer.

4. The liquid crystal display device according to claim 1, wherein the oriented film in the first polarizer has, on the opposite side of the surface facing the first polarizing film, one or more layers selected from the group consisting of a hard-coat layer, an antiglare layer, an antireflection layer, a low-reflection layer, a low-reflection antiglare layer, and an antireflection antiglare layer.

5. The liquid crystal display device according to claim 1, wherein the resin composition in the first adhesion-facilitating layer further comprises a crosslinking agent (C).

6. The liquid crystal display device according to claim 5, wherein the crosslinking agent in the first adhesion-facilitating layer is a melamine-based compound or an isocyanate-based compound.

7. The liquid crystal display device according to claim 1, wherein the acid value of the polyester resin (A) in the first adhesion-facilitating layer is 20 KOHmg/g or less.

8. The liquid crystal display device according to claim 1, wherein the degree of saponification of the polyvinyl alcohol resin (B) in the first adhesion-facilitating layer is 60 mol % or more and 85 mol % or less.

9. The liquid crystal display device according to claim 1, wherein the oriented film in each of the first and second polarizers has a second adhesion-facilitating layer, wherein in each of the first and second polarizers:
the first adhesion-facilitating layer is between the polarizing film and the oriented film, and
the second adhesion-facilitating layer is on the surface of the oriented film that is opposite to the surface facing the polarizing film.

10. The liquid crystal display device according to claim 1, wherein the oriented film in each of the first and second polarizers has a second adhesion-facilitating layer, wherein in each of the first and second polarizers:
the first adhesion-facilitating layer is between the polarizing film and the oriented film,
the second adhesion-facilitating layer is on the surface of the oriented film that is opposite to the surface facing the polarizing film, and
the second adhesion-facilitating layer comprises a resin composition comprising a polyester resin (A) and a polyvinyl alcohol resin (B).

11. The liquid crystal display device according to claim 9, wherein one or more layers selected from the group consisting of a hard-coat layer, an antiglare layer, an antireflection layer, a low-reflection layer, a low-reflection antiglare layer, and an antireflection antiglare layer is present on the light-outgoing side of the second adhesion-facilitating layer of the first polarizer.

12. The liquid crystal display device according to claim 10, wherein one or more layers selected from the group consisting of a hard-coat layer, an antiglare layer, an antireflection layer, a low-reflection layer, a low-reflection antiglare layer, and an antireflection antiglare layer is present on the light-outgoing side of the second adhesion-facilitating layer of the first polarizer.

13. A liquid crystal display device comprising a backlight source, a first polarizer, a liquid crystal cell, and a second polarizer, wherein
the liquid crystal cell has a light-outgoing side and a light-incoming side;
the first polarizer is disposed on the light-outgoing side of the liquid crystal cell;
the second polarizer is disposed on the light-incoming side of the liquid crystal cell;
the first polarizer comprises (a) a first polarizing film, (b) a protective film laminated on the light-outgoing side of the first polarizing film that is an oriented film having an in-plane retardation of 7,350 to 30,000 nm, a ratio of in-plane retardation to thickness-direction retardation (Re/Rth) of 0.2 or more and 2.0 or less, and a first adhesion-facilitating layer, and (c) a protective film laminated on the light-incoming side of the first polarizing film that is selected from the group consisting of a triacetyl cellulose film, an acrylic film, and a norbornene film;
the second polarizer comprises (a) a second polarizing film, (b) a protective film laminated on the light-incoming side of the second polarizing film that is an oriented film having an in-plane retardation of 7,350 to 30,000 nm, a ratio of in-plane retardation to thickness-direction retardation (Re/Rth) of 0.2 or more and 2.0 or less, and a first adhesion-facilitating layer, and (c) a protective film laminated on the light-outgoing side of the second polarizing film that is selected from the group consisting of a triacetyl cellulose film, an acrylic film, and a norbornene film; and the first adhesion-facilitating layer in each of the first and second polarizers comprises a resin composition comprising a polyester resin (A) and a polyvinyl alcohol resin (B).

14. The liquid crystal display device according to claim 13, wherein the oriented film in each of the first and second polarizers has a ratio of retardation to thickness-direction retardation (Re/Rth) of 0.2 or more and 1.2 or less.

15. The liquid crystal display device according to claim 13, wherein the oriented film in the first polarizer has, on the opposite side of the surface facing the first polarizing film, one or more layers selected from the group consisting of a hard-coat layer, an antiglare layer, an antireflection layer, a low-reflection layer, a low-reflection antiglare layer, and an antireflection antiglare layer.

16. The liquid crystal display device according to claim 13, wherein the add value of the polyester resin (A) in the first adhesion-facilitating layer is 20 KOHmg/a or less.

17. The liquid crystal display device according to claim 13, wherein the degree of saponification of the polyvinyl alcohol resin (B) in the first adhesion-facilitating layer is 60 mol % or more and 85 mol % or less.

18. The liquid crystal display device according to claim 13, wherein the oriented film in each of the first and second polarizers has a second adhesion-facilitating layer, wherein in each of the first and second polarizers:

the first adhesion-facilitating layer is between the polarizing film and the oriented film, and the second adhesion-facilitating layer is on the surface of the oriented film that is opposite to the surface facing the polarizing film.

19. The liquid crystal display device according to claim 13, wherein the oriented film in each of the first and second polarizers has a second adhesion-facilitating layer, wherein in each of the first and second polarizers:

the first adhesion-facilitating layer is between the polarizing film and the oriented film, the second adhesion-facilitating layer is on the surface of the oriented film that is opposite to the surface facing the polarizing film, and the second adhesion-facilitating layers comprises a resin composition comprising a polyester resin (A) and a polyvinyl alcohol resin (B).

20. The liquid crystal display device according to claim 19, wherein one or more layers selected from the group consisting of a hard-coat layer, an antiglare layer, an antireflection layer, a low-reflection layer, a low-reflection antiglare layer, and an antireflection antiglare layer is present on the light-outgoing side of the second adhesion-facilitating layer of the first polarizer.

21. The liquid crystal display device according to claim 13, wherein the resin composition in the first adhesion-facilitating layer further comprises a crosslinking agent (C).

22. The liquid crystal display device according to claim 21, wherein the crosslinking agent in the first adhesion-facilitating layer is a melamine-based compound or an isocyanate-based compound.

23. The liquid crystal display device according to claim 18, wherein one or more layers selected from the group consisting of a hard-coat layer; an antiglare layer, an antireflection layer, a low-reflection layer, a low-reflection antiglare layer, and an antireflection antiglare layer is present on the light-outgoing side of the second adhesion-facilitating layer of the first polarizer.

* * * * *